(12) United States Patent
Goodwill et al.

(10) Patent No.: US 9,927,575 B2
(45) Date of Patent: Mar. 27, 2018

(54) OPTICAL COUPLING USING POLARIZATION BEAM DISPLACER

(71) Applicants: Dominic John Goodwill, Ottawa (CA); Patrick Dumais, Ottawa (CA)

(72) Inventors: Dominic John Goodwill, Ottawa (CA); Patrick Dumais, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/162,765

(22) Filed: May 24, 2016

(65) Prior Publication Data

US 2016/0377811 A1  Dec. 29, 2016

Related U.S. Application Data

(60) Provisional application No. 62/184,699, filed on Jun. 25, 2015.

(51) Int. Cl.
*G02B 6/27* (2006.01)
*G02B 6/32* (2006.01)
(Continued)

(52) U.S. Cl.
CPC .......... *G02B 6/2706* (2013.01); *G02B 6/126* (2013.01); *G02B 6/30* (2013.01); *G02B 6/32* (2013.01); *G02B 6/34* (2013.01)

(58) Field of Classification Search
CPC ........ G02B 6/2706; G02B 6/126; G02B 6/30; G02B 6/32; G02B 6/34
See application file for complete search history.

(56) References Cited

U.S. PATENT DOCUMENTS 6,285,500 B1 * 9/2001 Ranalli ................. G02B 27/28
                                                    359/245
6,295,393 B1 * 9/2001 Naganuma ........... G02B 6/2713
                                                    385/11

(Continued)

FOREIGN PATENT DOCUMENTS

| CN | 1318764 A | 10/2001 |
| CN | 103217740 A | 7/2013 |
| WO | 2004104664 A1 | 12/2004 |

OTHER PUBLICATIONS

Zaoui et al., Grating coupler serving as polarization beam splitter in silicon-on-insulator platform, Proc. Inst. Electr. Opt. Commun. Eng, 2012.*

(Continued)

*Primary Examiner* — Peter Radkowski
(74) *Attorney, Agent, or Firm* — Gowling WLG (Canada) LLP

(57) ABSTRACT

An optical coupling apparatus for coupling an optical fiber to a photonic chip is described. The apparatus includes a collimating microlens for collimating light from the optical fiber; a polarization splitting beam displacer for separating the light collimated by the collimating microlens into orthogonally polarized X and Y component beams; at least one focusing microlens for directing the X and Y component beams separately onto the photonic chip; and first and second surface grating couplers (SGCs) orthogonally disposed on the photonic chip and configured for operation in a same polarization state, for coupling the X and Y component beams, respectively, to the photonic chip.

17 Claims, 16 Drawing Sheets

(51) Int. Cl.
  *G02B 6/34* (2006.01)
  *G02B 6/30* (2006.01)
  *G02B 6/126* (2006.01)

(56) References Cited

U.S. PATENT DOCUMENTS

| | | | | |
|---|---|---|---|---|
| 6,498,872 | B2* | 12/2002 | Bouevitch | G02B 6/2766 359/246 |
| 6,639,683 | B1* | 10/2003 | Tumbar | G01J 9/02 356/494 |
| 6,765,670 | B2* | 7/2004 | Olsson | G02B 6/29302 356/303 |
| 6,807,009 | B2* | 10/2004 | Morgan | G02B 6/266 359/634 |
| 6,810,169 | B2* | 10/2004 | Bouevitch | G02B 6/2766 359/246 |
| 6,859,573 | B2* | 2/2005 | Bouevitch | G02B 6/2766 349/193 |
| 7,058,251 | B2* | 6/2006 | McGuire, Jr. | G02B 6/3592 359/290 |
| 7,081,996 | B2* | 7/2006 | Wills | G02B 6/272 359/484.03 |
| 7,330,615 | B2* | 2/2008 | McGuire, Jr. | G02B 6/3592 385/16 |
| 7,519,247 | B2* | 4/2009 | McGuire, Jr. | G02B 6/3592 359/290 |
| 8,238,747 | B2* | 8/2012 | Xu | H04B 10/5053 398/188 |
| 8,861,979 | B2* | 10/2014 | Liu | H04B 10/25133 398/205 |
| 9,100,129 | B2* | 8/2015 | Baney | |
| 9,250,355 | B2* | 2/2016 | Deng | H04B 10/506 |
| 2001/0003371 | A1 | 10/2001 | Delisle et al. | |
| 2001/0033714 | A1 | 10/2001 | Delisle et al. | |
| 2001/0048556 | A1* | 12/2001 | Ranalli | G02F 1/31 359/484.06 |
| 2002/0009257 | A1* | 1/2002 | Bouevitch | G02B 6/2766 385/24 |
| 2002/0012167 | A1* | 1/2002 | Wills | G02B 6/272 359/484.03 |
| 2002/0181858 | A1* | 12/2002 | Bouevitch | G02B 6/2766 385/24 |
| 2003/0035605 | A1* | 2/2003 | Bouevitch | G02B 6/2766 385/1 |
| 2003/0090807 | A1* | 5/2003 | Morgan | G02B 6/266 359/634 |
| 2003/0197935 | A1 | 10/2003 | Takushima et al. | |
| 2004/0033010 | A1* | 2/2004 | McGuire, Jr. | G02B 6/3592 385/16 |
| 2004/0177995 | A1 | 9/2004 | Karavakis et al. | |
| 2006/0001887 | A1* | 1/2006 | Ranalli | G03F 7/70775 356/492 |
| 2006/0182387 | A1* | 8/2006 | McGuire, Jr. | G02B 6/3592 385/16 |
| 2007/0104418 | A1* | 5/2007 | McGuire, Jr. | G02B 6/3592 385/16 |
| 2008/0205821 | A1* | 8/2008 | McGuire | G02B 6/3592 385/17 |
| 2010/0080569 | A1* | 4/2010 | Xu | H04B 10/5053 398/152 |
| 2012/0257902 | A1* | 10/2012 | Deng | H04B 10/506 398/152 |
| 2013/0034352 | A1* | 2/2013 | Liu | H04B 10/25133 398/29 |
| 2013/0170843 | A1* | 7/2013 | Baney | H04B 10/61 398/212 |
| 2013/0182998 | A1 | 7/2013 | Andry et al. | |
| 2014/0126030 | A1* | 5/2014 | Crespi | G06N 99/002 359/108 |

OTHER PUBLICATIONS

Van Laere et all., Nanophotonic Polarization Diversity Demultiplexer Chip, Journal of Lightwave Technology, vol. 27, No. 4, 2009, p. 417.*

Carroll et al., Optimizing polarization-diversity couplers for Si-photonics: reaching the -1dB coupling efficiency threshold, Optics Express, vol. 22, No. 12, p. 14769, Jun. 9, 2014.*

International Search Report of International Patent Application No. PCT/CN2016/085129 dated Aug. 29, 2016.

* cited by examiner ized polarization splitter/combiner and on-chip surface grating couplers (SGCs) configured for operation in a single polarization state.

OPTICAL COUPLING USING POLARIZATION BEAM DISPLACER

TECHNICAL FIELD

The present description relates to optical coupling, and more particularly, to an optical coupling apparatus incorporating a polarization beam displacer.

BACKGROUND

For many photonic applications such as high-capacity photonic switching, photonic transmitters and photonic receivers, it is necessary to couple light between optical fibers and a photonic chip. There are size limitations to the design of the coupler. A typical large size photonic chip may be in the scale of 25 mm by 25 mm. Single mode optical fibers produced commercially typically have a cladding diameter of 125 µm to 250 µm. In such a case, a maximum of 100-200 fibers can be arranged in a line across a photonic chip. To achieve a larger number count, such as 1000 fibers, a two-dimensional array of fibers may be required. Coupling an array of fibers to a photonic chip can be achieved using an array of optical couplers.

Light propagating in most optical fibers contains two orthogonal polarization components. Photonic chip circuits, however, often operate in a single polarization. One solution is to implement so called polarization diversity to perform the desired operations of the chip on two polarization components in parallel. For example, in a photonic switch with polarization diversity, the switching between inputs and outputs may be done by switching both components in an identical manner. As well, in a receiver for a polarization encoded signal, each component may need to be directed to a separate receiving circuit operating in a single polarization of light.

Accordingly, an apparatus is desired that can couple light between a fiber array and a photonic chip with polarization diversity.

SUMMARY

The following presents a summary of some aspects or embodiments of the disclosure in order to provide a basic understanding of the disclosure. This summary is not an extensive overview of the disclosure. It is not intended to identify key or critical elements of the disclosure or to delineate the scope of the disclosure. Its sole purpose is to present some embodiments of the disclosure in a simplified form as a prelude to the more detailed description that is presented later.

Described herein are apparatuses and methods for coupling light between an optical fiber (or an optical fiber array) and a photonic chip. In accordance with disclosed embodiments, the optical coupling apparatus uses an off-chip polar- In accordance with one aspect of the disclosure, there is provided an optical coupling apparatus for coupling an optical fiber to a photonic chip. The apparatus includes a collimating microlens for collimating light from the optical fiber; a polarization splitting beam displacer for separating the light collimated by the collimating microlens into orthogonally polarized X and Y component beams; at least one focusing microlens for directing the X and Y component beams separately onto the photonic chip; and first and second surface grating couplers (SGCs) orthogonally disposed on the photonic chip and configured for operation in a same polarization state, for coupling the X and Y component beams, respectively, to the photonic chip.

In accordance with some embodiments, the at least one focusing microlens comprises a single focusing microlens for directing both the X and Y component beams, respectively, onto the first and second SGCs. In accordance with other embodiments, the at least one focusing microlens comprises first and second focusing microlenses for directing the X and Y component beams, respectively, onto the first and second SGCs, respectively.

In accordance with some embodiments, the optical coupling apparatus further comprises an array of optical fibers including the optical fiber; a collimating microlens array including the collimating microlens, for collimating light from the array of optical fibers, a focusing microlens array including the at least one focusing microlens, for directing the X and Y component beams separately onto the photonic chip; and an SGC array configured for operation in a same polarization state and comprising first and second SGC sub-arrays including the first and second SGCs, respectively. The polarization splitting beam displacer is configured for separating light collimated by each microlens of the collimating microlens array into orthogonally polarized X and Y component beams; and the first and second SGC sub-arrays are configured for coupling the X and Y component beams, respectively, separately to the photonic chip.

In accordance with another aspect of the disclosure, there is provided a method for coupling light between an optical fiber and a photonic chip. The method comprises collimating light from the optical fiber; separating the collimated light into orthogonally polarized X and Y component beams; directing the X and Y component beams separately onto the photonic chip; and coupling the X and Y component beams to the photonic chip respectively by first and second surface grating couplers (SGCs) orthogonally disposed on the photonic chip and configured for operation in a same polarization state.

BRIEF DESCRIPTION OF THE DRAWINGS

These and other features of the disclosure will become more apparent from the description in which reference is made to the following appended drawings.

DETAILED DESCRIPTION

Figure 1:
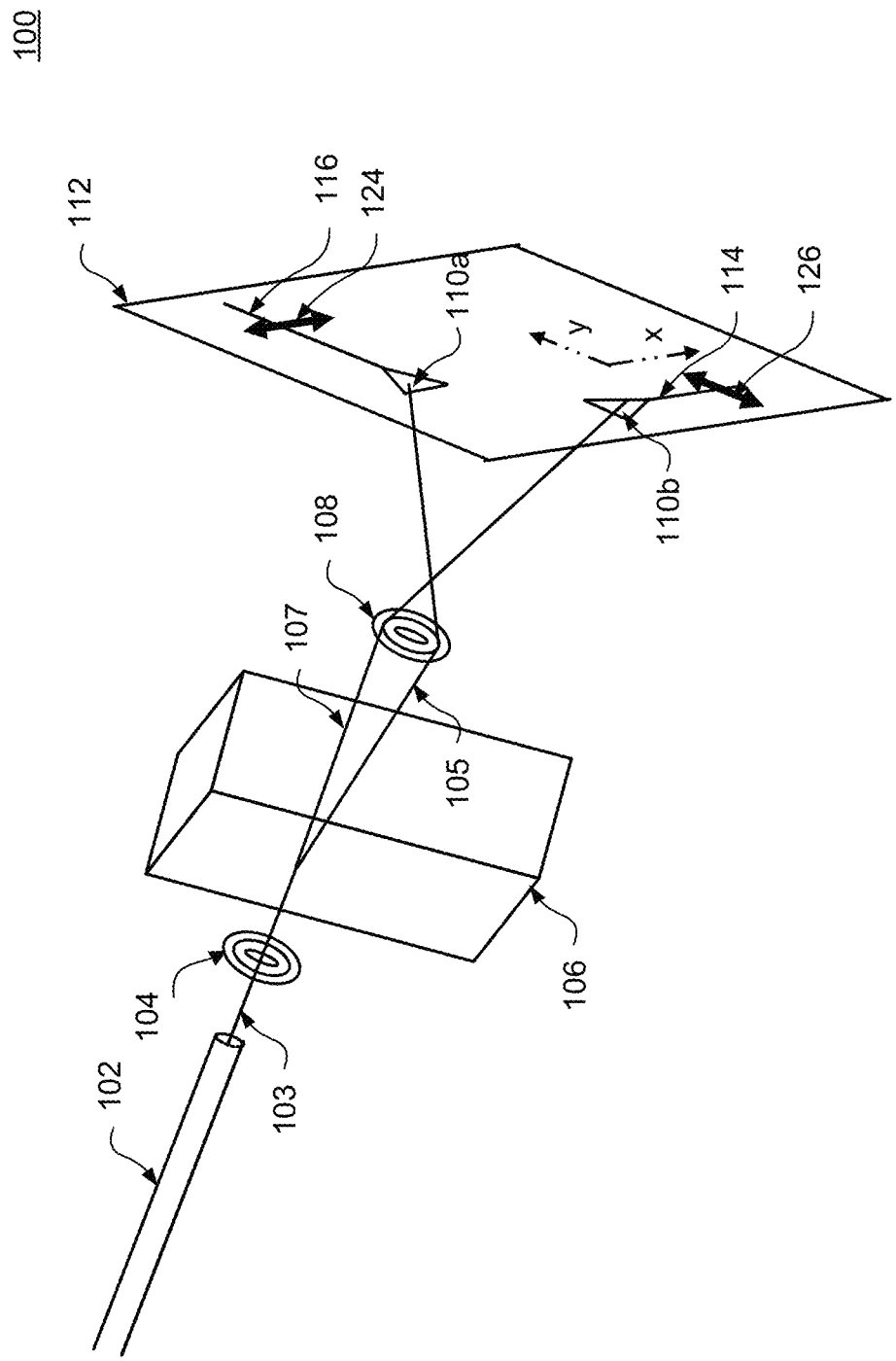
FIG. 1 is a perspective view of an optical coupling apparatus, according to one embodiment of the disclosure.

The following detailed description contains, for the purposes of explanation, numerous specific details in order to provide a thorough understanding of the preferred embodiments of the disclosure. It is apparent, however, that the preferred embodiments may be practiced without these specific details or with an equivalent arrangement. In other instances, some well-known structures and devices are shown in block diagram form to avoid unnecessarily obscuring the preferred embodiments of the disclosure. The description should in no way be limited to the illustrative implementations, drawings, and techniques illustrated below, including the exemplary designs and implementations illustrated and described herein, but may be modified within the scope of the appended claims along with their full scope of equivalents.

Described herein are apparatus and method for coupling light between an optical fiber (or an optical fiber array) and a photonic chip. For the purpose of this disclosure, a "channel" refers to the passage between one optical fiber and the photonic chip.

One way to achieve polarization diversity for a photonic chip is to split light from the output of the optical fiber into two orthogonal polarization components by a polarization splitter (PS). The two components are referred to as an X component and a Y component, respectively. One of the components, for example the X component, may be coupled into the photonic chip as a Transverse Electric (TE) mode, and the other component, for example the Y component, may be coupled into the photonic chip as a Transverse Magnetic (TM) mode. The PS can be used with a polarization rotator (PR), where one of the components can be rotated by the PR so that both components can be in the same mode, be it TE or TM. The PS and PR can be referred to collectively as a polarization splitter-rotator (PSR). After performing desired operations of the photonic chip separately for the two components, one component can be rotated again by another PR, and recombined with the other component by a polarization combiner (PC). The PR and PC can be referred to collectively as polarization rotator-combiner (PRC).

An on-chip PS/PC or PSR/PRC can be physically large and may have large optical loss. An off-chip PS/PC or PSR/PRC can have lower optical loss, by using bulk materials and thin films. However, the cost of off-chip PS/PC or PSR/PRC can be high unless they are shared between many channels.

On-chip PSR/PRC may be used with edge couplers. However, edge couplers may not scale to a large channel count because of the comparatively large outer diameters of optical fibers. For example, a single line of 1000 single mode optical fibers can be 12.5 cm wide, which can be 5 times the width of the edge of a large size chip.

A surface grating coupler (SGC) is an optical device that may be fabricated on a photonic chip, which couples light from an incident optical beam into one or more waveguides of the photonic chip. The SGC may also be used in the opposite direction to couple light from the photonic chip to an optical fiber. An SGC may couple light into a TE polarization mode of a waveguide. Such an SGC is called a TE SGC. Another type of an SGC may couple light into a TM polarization mode of a waveguide. Such an SGC is called a TM SGC. Both TE SGC and TM SGC are configured for operation only in a single polarization mode. For light of a given wavelength and incident angle, a TE SGC and TM SGC have different structures, because the effective refractive index of TE modes and TM modes are different. SGCs include very small scale features that are challenging to make in low-cost manufacturing processes, and it is difficult to achieve the nominal coupling angle with high yield. The coupling angle of the TE SGC and TM SGC react differently to variations of the manufacturing process. Thus, it is extremely challenging to manufacture TE SGC and TM SGC of the same coupling angle in the same photonic chip, with high yield. Accordingly, it may be advantageous to construct a dual-polarization coupling apparatus having only one type of SGC.

A SGC that couples incident light of both polarization components to respectively TE and TM modes of one or two waveguides is known as a dual-polarization SGC. However, dual-polarization SGCs are much more difficult to manufacture than single-polarization SGCs, and the optical loss of a dual-polarization SGC is several dB worse than that of a single-polarization SGC, be it TE SGC or TM SGC. Thus, it may be advantageous to construct a dual-polarization coupling apparatus, without using any dual-polarization SGC.

In accordance with various embodiments of the disclosure, an optical coupling apparatus is provided incorporating an off-chip PS/PC and single-polarization SGCs.

FIG. 1 is a simplified illustration of an optical coupling apparatus 100, according to one embodiment of the disclosure.

Referring to FIG. 1, light beam 103 from an optical fiber 102 is collimated by a collimating microlens 104. A PS 106, referred to as a polarization splitting beam displacer, splits the light beam 103 collimated by the collimating microlens 104 into orthogonally polarized X, Y component beams 105, 107. In the embodiment illustrated by way of FIG. 1, the polarization splitting beam displacer 106 is a birefringent plate. As will be explained in more detail, the polarization splitting beam displacer 106 includes polarization-dependent properties that can cause the X, Y component beams 105, 107 to propagate along different optical paths. In other words, the polarization splitting beam displacer 106 splits a dual-polarization light beam 103 into two single-polarization component beams 105, 107, which are spatially separated from each other. The separation may be achieved at the output of the polarization splitting beam displacer 106. Alternatively or additionally, the X, Y component beams 105, 107 can exit the polarization splitting beam displacer 106 at an angle with respect to each other. The X, Y component beams 105,107 are passed through a focusing microlens 108 which directs the X and Y component beams 105, 107 separately onto a photonic chip 112. The photonic chip 112 includes first and second SGCs 110a, 110b for coupling the X and Y component beams 105, 107, respectively, to the photonic chip 112. The first and second SGCs 110a, 110b are single polarization SGCs configured for operation in a same polarization state (such as TE, for example). As will be explained in more detail, the X and Y component beams 105, 107 are directed away from each other by the focusing microlens 108 and towards the photonic chip 112, such that angles of incidence of the X and Y component beams 105, 107 onto the photonic chip 112 correspond to coupling angles of the corresponding SGCs 110a, 110b.

The first and second SGCs 110a, 110b are orthogonally disposed on the photonic chip 112. That is, the first and second SGCs 110a, 110b have layout axes forming a 90° angle with respect to each other. In particular, the SGC layout axis 116 (i.e., parallel to the y direction in FIG. 1) of the SGC 110a for X component is orthogonal to the SGC layout axis 114 (i.e., parallel to the x direction in FIG. 1) of the SGC 110b for Y component. This way, the electric field 124 of the X component beam 105 can be orthogonal to the SGC layout axis 116 of the first SGC 110a. As well, electric field 126 of the Y component beam 107 can be orthogonal to the SGC layout axis 114 of the second SGC 110b. Thus, both SGCs 110a, 110b can operate in a same polarization state. In this particular example, both SGCs 110a, 110b have TE polarization even though the X and Y component beams 105, 107 have orthogonal polarizations. By using the optical coupling apparatus 100, light from polarization-uncontrolled optical fiber(s) 102 can be coupled to twice the number of polarization-defined waveguides, using the SGCs 110a, 110b.

Figure 2:
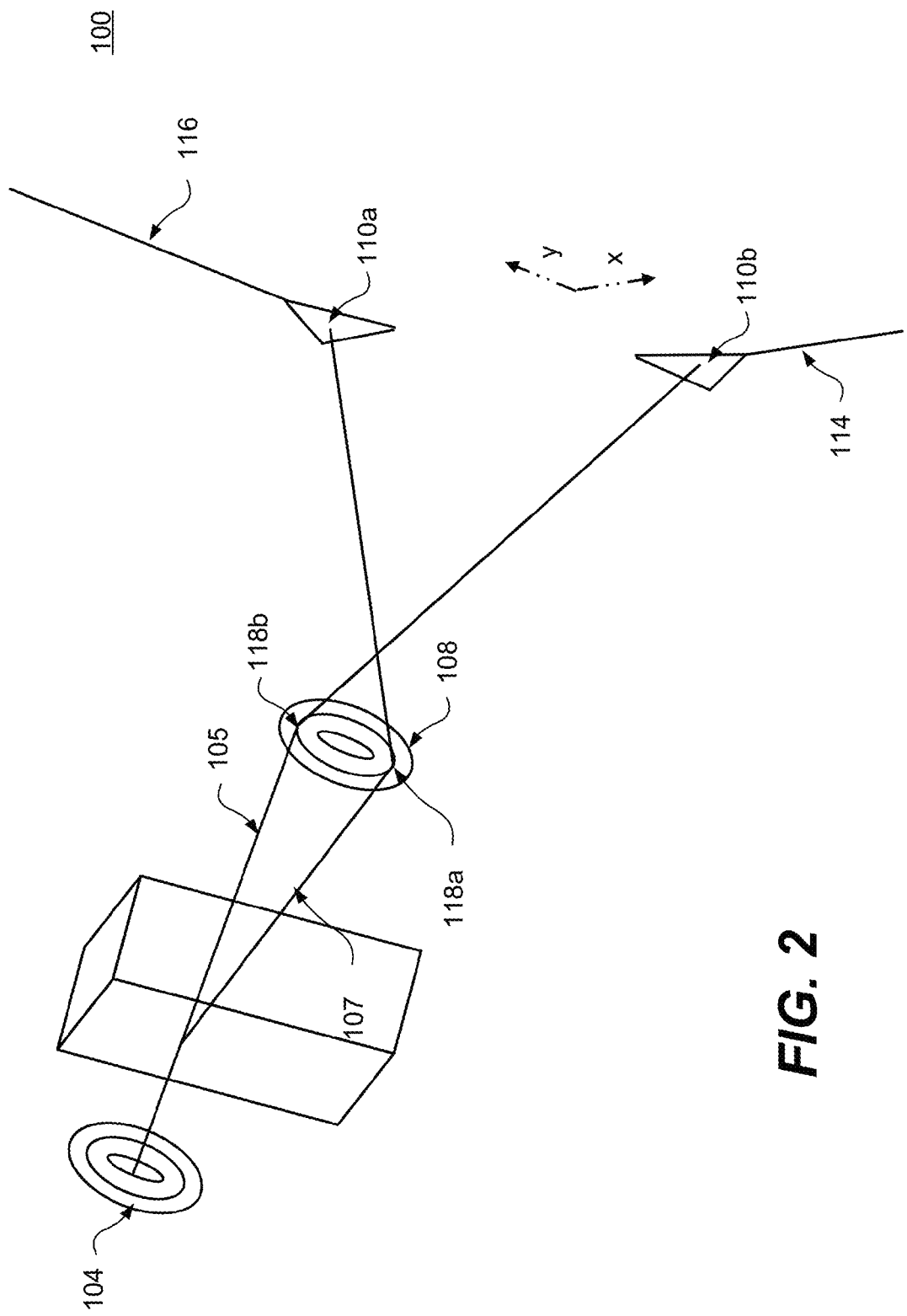
FIG. 2 is an illustration of the divergence of the X, Y component beams of the embodiment of FIG. 1.

FIG. 2 is an illustration of the optical paths of the X, Y component beams 105, 107 in the optical coupling apparatus 100. As shown in FIG. 2, the central rays of X and Y component beams 105, 107 propagate through the focusing microlens 108 with intersections 118a, 118b respectively and do not propagate on the optical axis of the focusing microlens 108. To simplify the Figures, the microlenses 104, 108 are illustrated as flat structures. In practice, microlenses 104, 108 may have a 3-dimensional profile.

The optical axis of a microlens in an array of microlenses may be defined as a line normal to the plane of the microlens array that contains the microlens, such that an optical ray propagating along the optical axis passes through the microlens without any angular deviation. For example, if the microlens is of refractive type and has a plane surface and a spherical surface, then the optical axis is through the most prominent point of the spherical surface. The optical axis of a microlens may not be at its physical center.

If the center of a beam passes through the optical axis of a microlens, then the beam generally does not acquire any angular deviation. A beam whose central ray passes through a microlens off the optical axis acquires an angular deviation. This known physical principle is exploited to manipulate the light to achieve different angles for the X component beam 105 and the Y component beam 107.

The central rays of X and Y component beams 105, 107 can impinge on the focusing microlens 108 at different points on the focusing microlens 108 and/or at different angles with respect to its optical axis. The focusing microlens 108 can be arranged such that at least one component beam 105, 107 is an off-axis ray (i.e., a ray that propagates in a plane including the optical axis of the microlens but not along the optical axis). For example, at least one of the X and Y component beams 105, 107 can impinge on the focusing microlens 108 parallel to its optical axis but offset with respect to its optical axis. Alternatively, the focusing microlens 108 can be arranged such that at least one component beam 105, 107 is a skew ray (skew beam) (i.e., a ray that is neither parallel to nor intersecting the optical axis of the microlens). The focusing microlens 108 is arranged such that the X component beam 105 is directed along +y direction, and the Y component beam 107 is directed along +x direction.

The coupling angle of the SGC 110a, 110b and the propagation angle in the polarization splitting beam displacer 106 may be different. Therefore, the focusing microlens 108 can be used to change the angles of the component beams 105, 107 so that they match the coupling angle of the SGC 110a, 110b. However, it is to be understood that the focusing microlens 108 may deflect just one of the component beams 105, 107. In other words, one of the component beams 105, 107 can pass through the focusing microlens 108 without acquiring any angular deviation. The focusing microlens 108 focuses each component beam 105, 107 into a small spot that matches the spot size of the SGC 110a, 110b.

For purposes of simplicity, FIGS. 1 and 2 only illustrate the light beam from one optical fiber 102. It should be appreciated that the optical fiber 102 can be part of an optical fiber array and a similar result can be replicated across the fiber array. The optical fibers may be arranged in a line, or as a two-dimensional array. For the purpose of this disclosure, the term "array" is used to refer to a one-dimensional array or a two-dimensional array. The optical fiber(s) may be arranged for the light to enter the polarization splitting beam displacer 106 at any desired angle. The optical fiber array may be on a square grid, rectangular grid, hexagonal grid, or another grid. The grid may be uniform or non-uniform.

Although many embodiments are explained with reference to TE SGCs, it should be appreciated that TM SGCs can be used instead of TE SGCs. For example, the SGCs can be all TM SGCs followed by TM circuits in the photonic chip 112, or the SGCs can be all TM SGCs followed by PRs to TE circuits in the photonic chip 112. The orthogonality of the SGC layout axes 116, 114 of the first and second SGCs 110a, 110b enables the use of single-polarization SGCs for dual-polarization coupling purposes.

Figure 3:
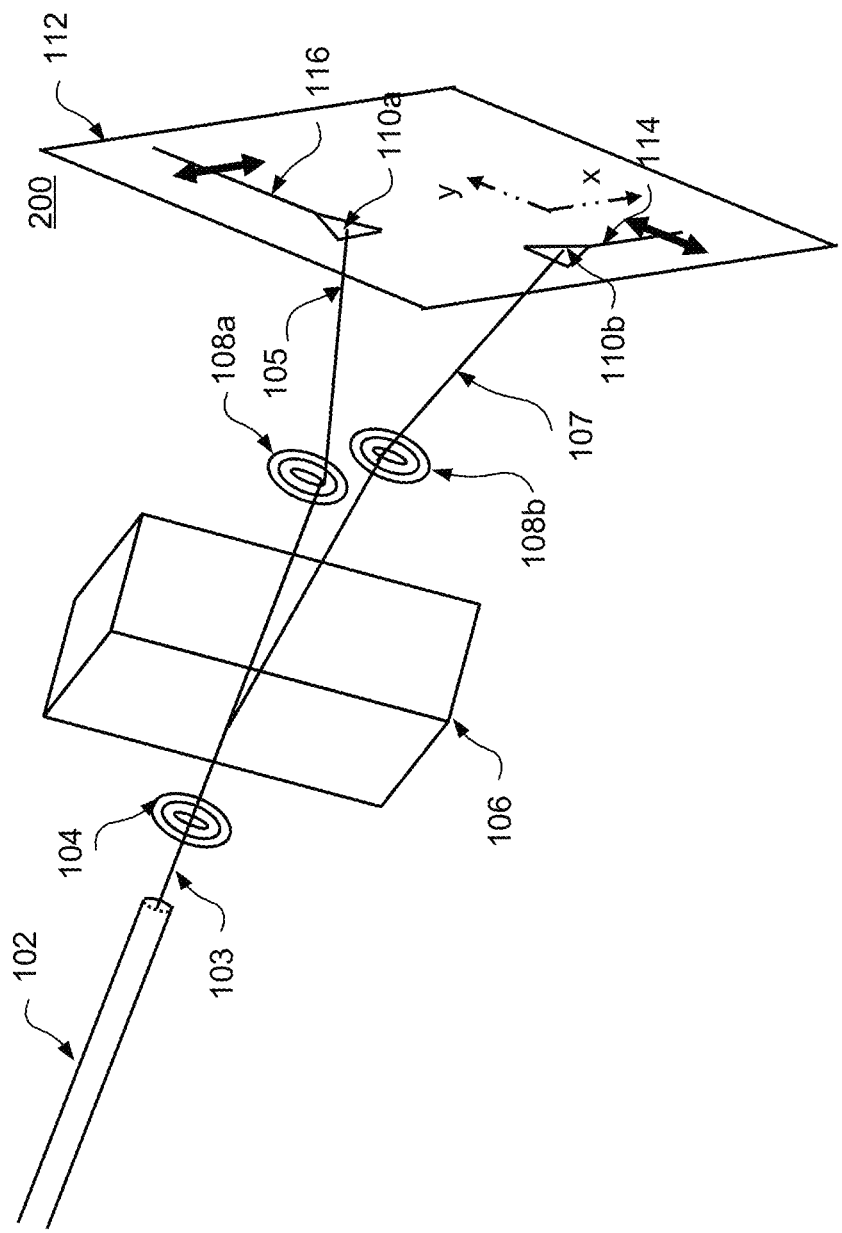
FIG. 3 is a perspective view of an optical coupling apparatus, according to another embodiment of the disclosure.

FIG. 3 is a perspective view of an optical coupling apparatus 200, according to another embodiment of the disclosure. Similar to the embodiment of FIG. 1, the light 103 from the fiber 102 becomes separated for X, Y component beams 105, 107 after passing through the polarization splitting beam displacer 106. However, in the embodiment illustrated by way of FIG. 3, the X component beam 105 propagates through a first focusing microlens 108a for directing the X component beam 105 to the first SGC 110a for X component. The Y component beam 107 propagates through a second focusing microlens 108b separate from the first focusing microlens 108a for directing the Y component beam 107 to the second SGC 110b for Y component.

Figure 4:
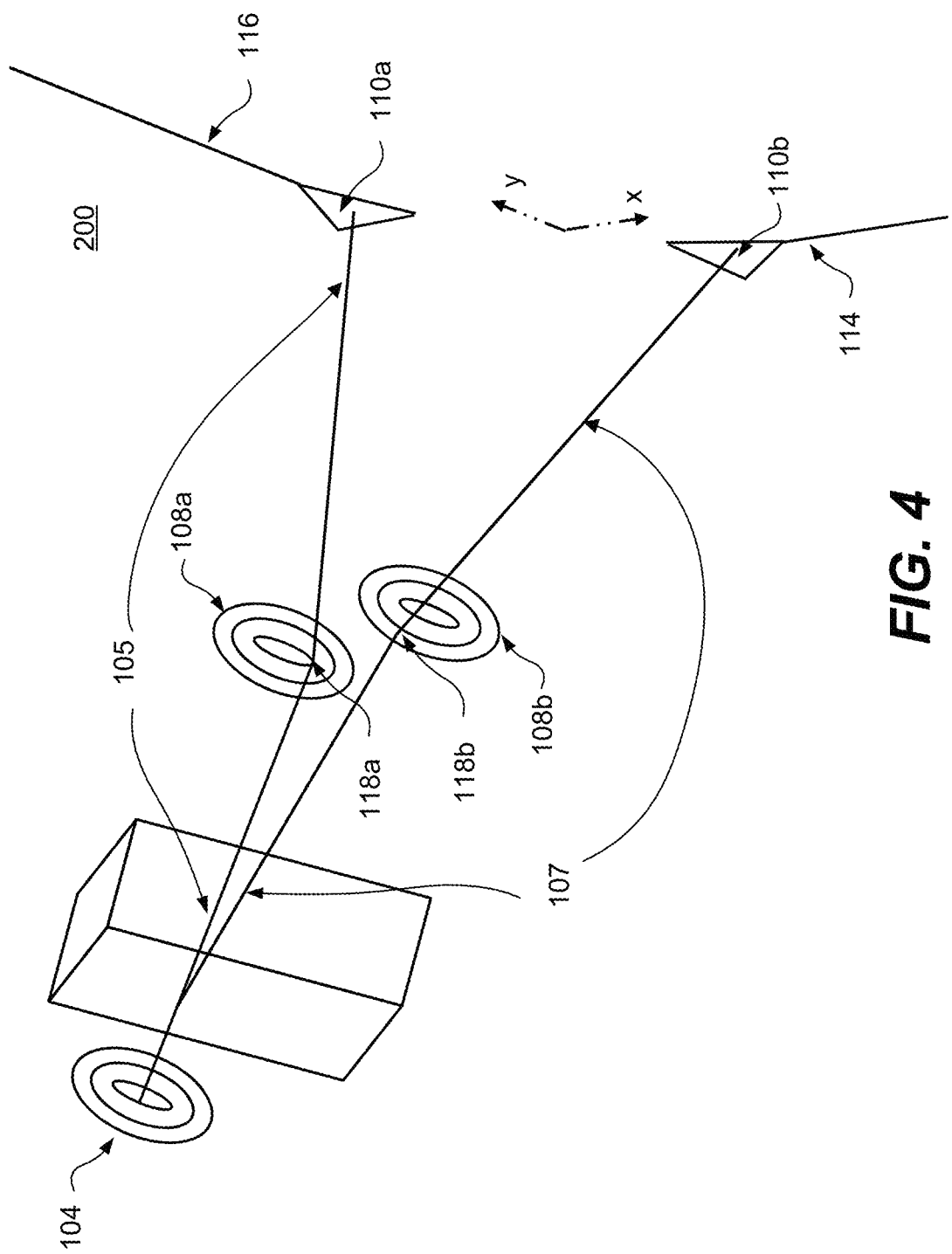
FIG. 4 is an illustration of the divergence of the X, Y component beams of the embodiment of FIG. 3.

FIG. 4 is an illustration of the optical paths of the X, Y component beams 105, 107 in the optical coupling apparatus 200. Similar to the embodiment of FIG. 1, the central ray of X component beam 105 does not propagate through the focusing microlens 108a via its optical axis (with intersections 118a). As well, the central ray of Y component beam 107 does not propagate through the focusing microlens 108b via its optical axis (with intersection 118b). The focusing microlenses 108a, 108b can be arranged such that at least one component beam 105, 107 is an off-axis ray. For example, at least one of the X and Y component beams 105, 107 can impinge on the corresponding focusing microlenses 108a, 108b parallel to their respective optical axis but offset with respect to their respective optical axis. Alternatively, the focusing microlenses 108a, 108b can be arranged such that at least one component beam 105, 107 is a skew ray (skew beam). The focusing microlens 108a is arranged such that the X component beam 105 is directed along +y direction, and the focusing microlens 108b is arranged such that Y component beam 107 is directed along +x direction.

As explained with reference to FIGS. 1 and 2, the focusing microlenses 108a, 108b may be used to change the angles of the component beams 105, 107. However, it is to be understood that the focusing microlenses 108a, 108b may deflect only one or none of the component beams 105, 107. In other words, one or both component beams 105, 107 can pass through the focusing microlenses 108a, 108b without acquiring any angular deviation. The focusing microlenses 108a, 108b focus each component beam 105, 107 into a small spot that matches the spot size of the SGC 110a, 110b.

Figure 5:
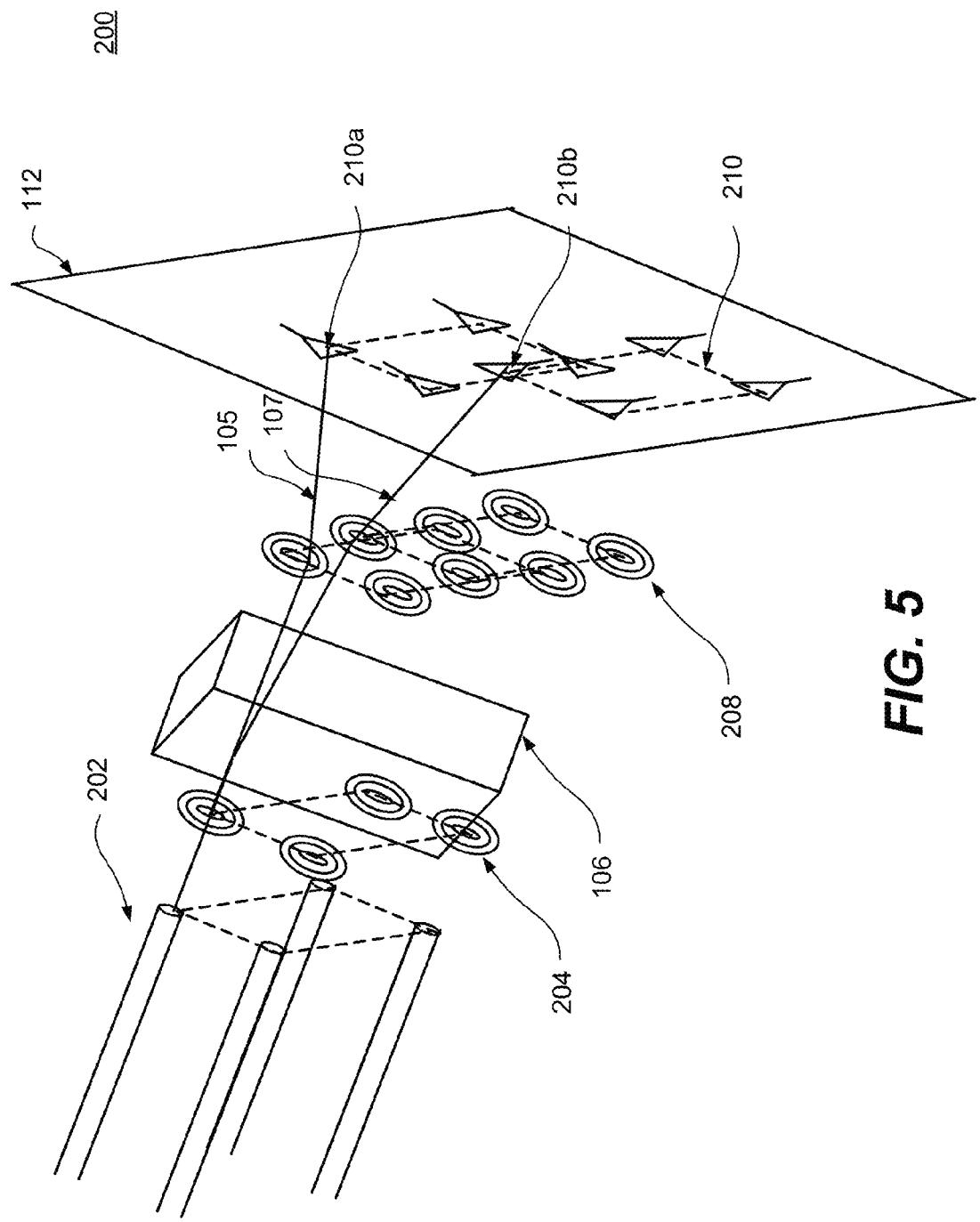
FIG. 5 is a perspective view of the embodiment of FIG. 3 including a two-dimensional fiber array.

FIG. 5 is a perspective view of the optical coupling apparatus 200 including a two-dimensional optical fiber array 202. As shown, the two-dimensional optical fiber array 202 is a 2×2 array, and X, Y component beams 105, 107 from one optical fiber of the 2×2 array are traced through the optical coupling apparatus 200.

When the optical fiber 102 is a member of an optical fiber array 202, the collimating microlens 104 is a member of a collimating microlens array 204 and the focusing microlens 108 is a member of a focusing microlens array 208. The polarization splitting beam displacer 106 can be used to separate light collimated by each microlens of the collimating microlens array 104 into orthogonally polarized X and Y component beams. The SGCs on the photonic chip 112 form a SGC array 210 including first and second SGC sub-arrays 210a, 210b configured for coupling the X and Y component beams, respectively, to the photonic chip 112. As discussed above, the SGCs in the SGC array 210 are configured for operation in a same polarization state (such as TE). Every SGC for X component in the first SGC sub-array 210a is orthogonally disposed on the photonic chip 112 with respect to a SGC for Y component in the second SGC sub-array 210b. The dashed lines in FIG. 5 are drawing construction lines, to illustrate the relative position of the elements. Although in the embodiment illustrated in FIG. 5, a single polarization splitting beam displacer 106 is provided to split all the beams from the fiber array 202, it should be understood more than one polarization splitting beam displacer may be used in other implementations. The collimating 204 and focusing 208 microlens arrays may include many microlenses for collimating light emitted by multiple optical fibers in an optical fiber array.

Figure 6:
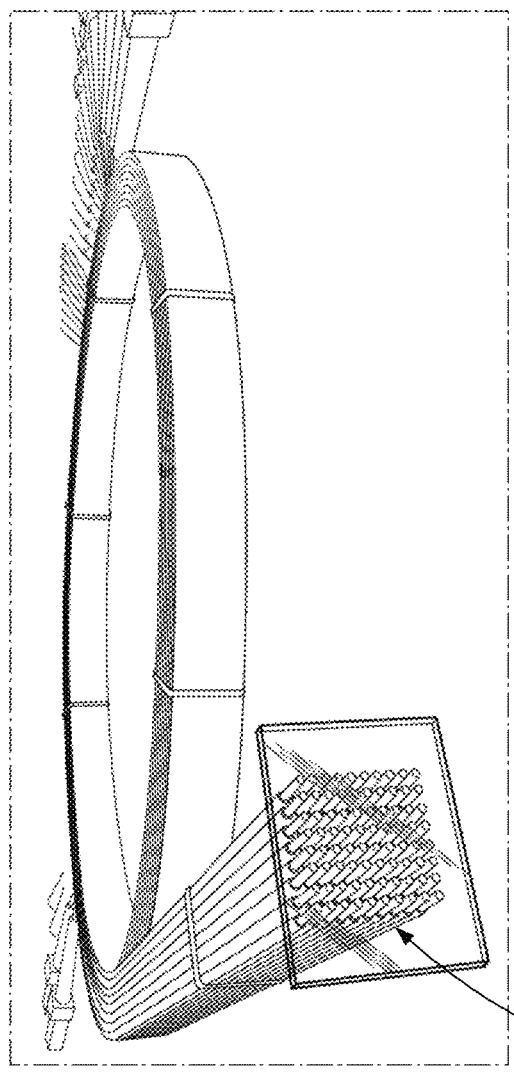
FIG. 6 is an example of a two-dimensional fiber array that can be used as part of or in connection with the optical coupling apparatus.

FIG. 6 is an example of a two-dimensional optical fiber array 202 that can be used as part of or in connection with the optical coupling apparatus 100, 200. It is to be understood that the figure is provided only for illustration of a particular example and other arrangements of the two-dimensional optical fiber array are possible.

According to various embodiments, the polarization splitting beam displacer 106 has polarization-dependent properties enabling splitting of an incident dual-polarization light into two orthogonal components. A typical polarization splitting beam displacer uses a crystal that has a refractive index which varies depending on the polarization and the direction of propagation of light. Materials for polarization splitting beam displacers may include Yttrium Vanadate (YVO$_4$) crystal, Barium Borate (α-BBO) crystal, Calcite crystal, Rutile (TiO$_2$) crystal, and the like. It should be understood that various other suitable materials can be used for the polarization splitting beam displacer 106. The polarization splitting beam displacer 106 may be mated to the microlens arrays (the collimating microlens array 204 and/or the focusing microlens array 208) using an optically transparent adhesive. With a YVO$_4$ crystal, a polarization splitting beam displacer can produce 0.1 mm lateral displacement for each 1.0 mm thickness of crystal. Thus, a displacement of 127 μm may be achieved with a crystal of approximately 1.3 mm thickness (1:10 ratio). Crystals can be precision polished to achieve accurate beam displacement.

Depending on the orientation of the incident light with respect to the axis of the crystal, the polarization splitting beam displacer 106 may pass one polarization component undeviated and the other at an angle, or may deviate both component beams 105, 107 by equal and opposite angles with respect to the incident light 103, or may deviate both component beams by non-equal angles. In all cases, the purpose is to create two component beams 105, 107 which propagate differently through the polarization splitting beam displacer 106, so as to produce a separation at the output of the polarization splitting beam displacer. The beams 105, 107 exiting the polarization splitting beam displacer 106 may be parallel to each other, and/or parallel to the incident beam 103, or may be angled with respect to each other and/or the incident beam. All of the above implementations are possible, and depending on the desired characteristics any suitable arrangement and design can be used.

Various types of microlenses, such as refractive, diffractive, spherical, aspherical, elliptical, or graded-index (GRIN) microlenses, may be used for the collimating microlens 104 and/or focusing microlens 108. As well, microlenses with various manufacturing materials and methods may be used including glass microlenses, polymer microlenses, etched microlenses, deposited microlenses, or diffusion microlenses. The particular design and manufacture of the microlenses can be selected based on cost and specification requirements of a particular implementation.

In some embodiments, one or both of the collimating and focusing microlenses 104, 108 may comprise compound lens elements to reduce an undesired optical aberration such as spherical aberration, chromatic aberration and/or coma aberration.

Mechanical spacers may be provided between successive elements to achieve correct optical beam focusing distance(s). In particular, mechanical spacers may be placed between the fiber 102 and the collimating microlens 104, between the collimating microlens 104 and the focusing microlens 108, and/or between the focusing microlens 108 and the photonic chip 112. The mechanical spacers are used for achieving correct optical distances between the elements. A spacer may be provided defining a distance between the focusing microlens 108 and the photonic chip 112. Each mechanical spacer may be a planar optical element, with optional mechanical structures. The part of each mechanical spacer through which the beam passes may be made of air, glass, index-matching adhesive, or any other suitable transparent optical material, dependent on factors such as the type of the microlenses.

According to the disclosure, for cases where the microlenses 104, 108 are refractive, diffractive or GRIN type, the gaps between the fiber 102 and the collimating microlens 104 and between the focusing microlens 108 and the photonic chip 112 may be filled with air or other medium of low refractive index. When the microlenses 104, 108 are GRIN microlenses, these gaps may be filled with index matching material such as optical adhesive. Anti-reflection coatings may be used to reduce back-reflection.

Figure 7:
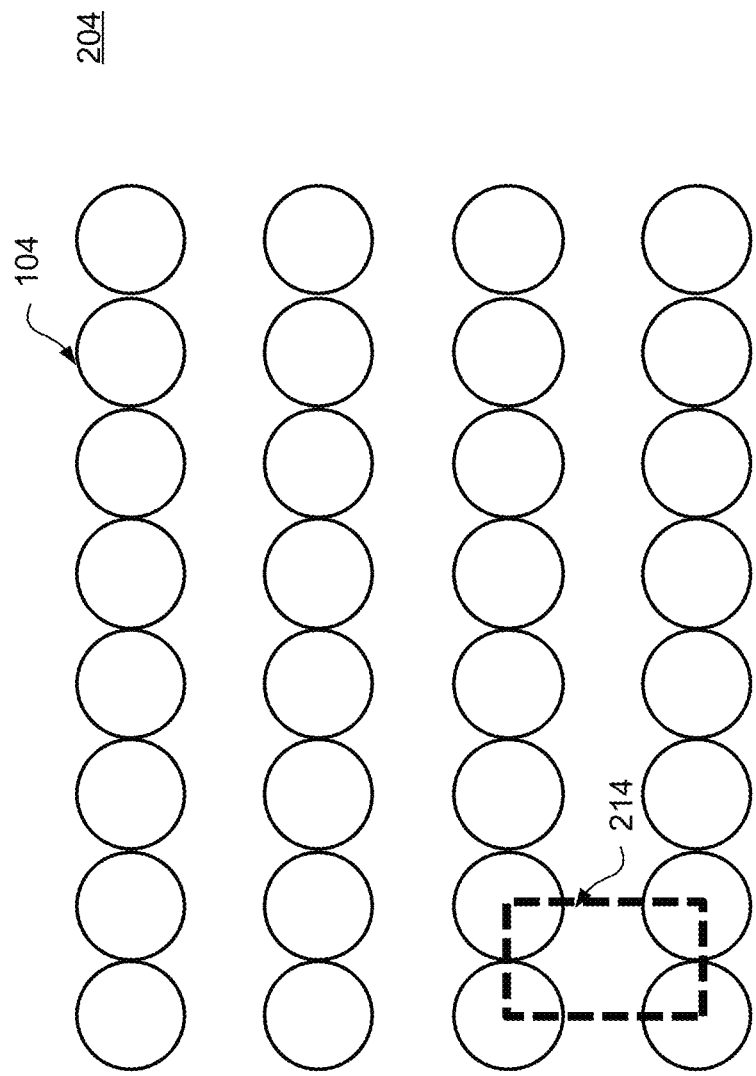
FIG. 7 is a cross-section view of a collimating microlens array, according to one embodiment.
Figure 8:
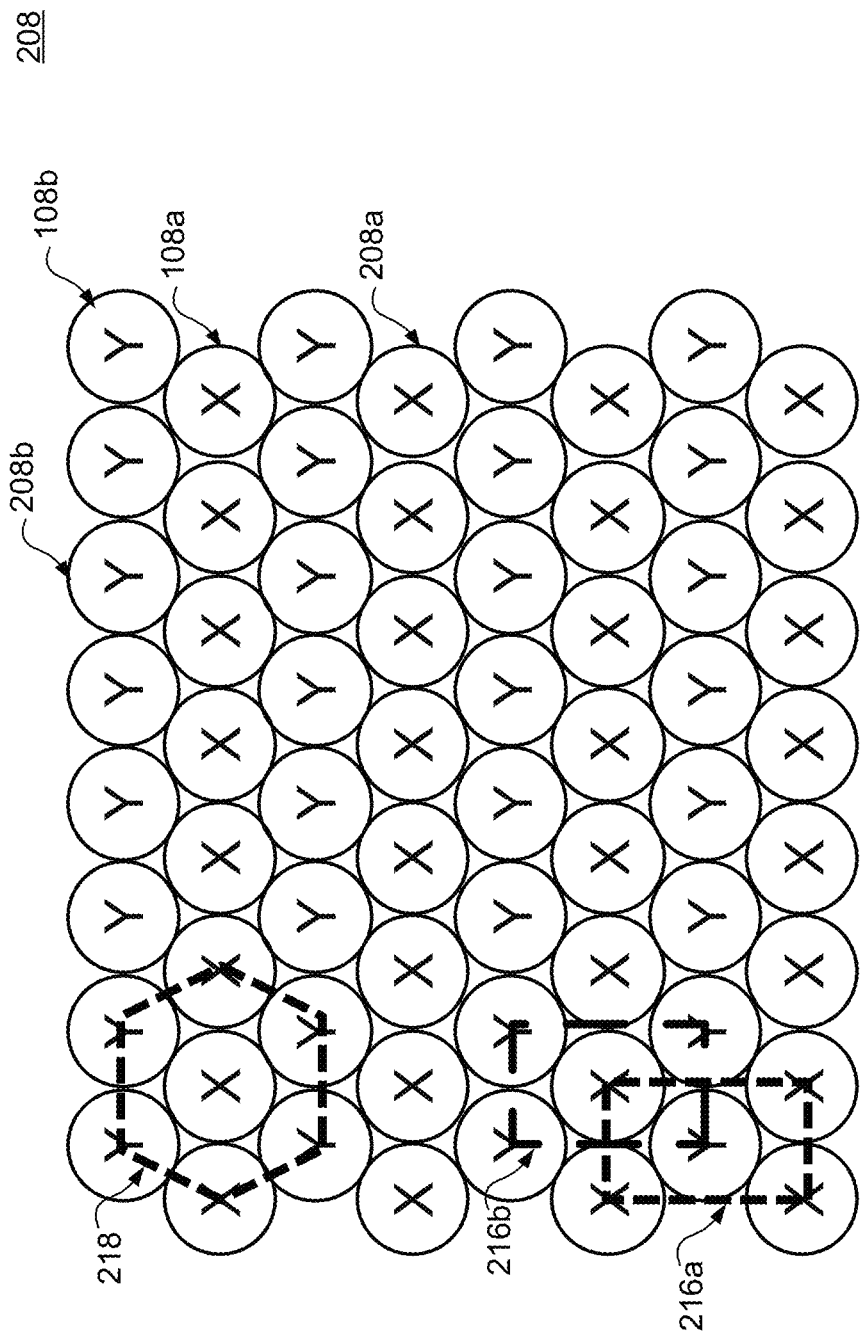
FIG. 8 is a cross-section view of a focusing microlens array, according to one embodiment.

According to the embodiment illustrated by way of example by FIG. 3, for light beam from one fiber 102, two focusing microlenses 108a, 108b are used for directing the X and Y component beams, respectively, onto the first and second SGCs 110a, 110b. FIGS. 7 and 8 illustrate a spatial relationship of the focusing microlenses 108a, 108b, according to such an embodiment.

FIG. 7 is a cross-sectional view of a collimating microlens array 204; and FIG. 8 is a cross-sectional view of a corresponding focusing microlens array 208. The collimating microlenses highlighted by rectangle 214 in FIG. 7 may be of the same scale as the focusing microlenses highlighted by rectangle 216a, 216b in FIG. 8. As shown, the focusing microlens array 108 can include first and second focusing microlens sub-arrays 208a, 208b for focusing the X and Y component beams, respectively, onto the first and second SGC sub-arrays 210a, 210b. The first focusing microlens sub-array 208a for focusing the X component beams is symbolized by circles with X; and the second focusing microlens sub-array 208b for focusing the Y component beams is symbolized by circles with Y. Focusing microlenses highlighted by rectangle 216a in FIG. 8 are used for focusing the X component beams from the collimating microlenses highlighted by rectangle 214 in FIG. 7. Focusing microlenses highlighted by rectangle 216b are used for focusing the corresponding Y component beams. As illustrated in FIG. 8, the first and second focusing microlens sub-arrays 208a, 208b are arranged in alternating rows in the focusing microlens array 208. The alternating rows can form a non-rectangular pattern of microlenses. In one particular embodiment, a focusing microlens 108b for Y component can be offset laterally with respect to a corresponding focusing microlens 108a for X component by an amount generally equal to the radius of the focusing microlens. In such an example, the focusing microlens 108b for Y component is arranged diagonally at 60 degrees from the corresponding focusing microlens 108a for X component to achieve a nearly hexagonal close-packed arrangement (illustrated by hexagon 218). It should be understood that other suitable spatial relationships between the X focusing microlenses 108a and Y focusing microlenses 108b can be arranged.

In the embodiment illustrated in FIG. 7 and FIG. 8, the number of focusing microlenses in the focusing microlens array 208 is twice the number of collimating microlenses in the collimating microlens array 204. In some implementations, microlenses in the focusing microlens array 208 may be closer to each other than those in the collimating microlens array 204, because the focusing microlens array 208 has twice smaller pitch as the collimating microlens array 204. Thus, there may be more clipping of the edges of the beams at the collimating microlens array 208.

According to an alternative embodiment, an optical coupling apparatus is provided where two beams can share a microlens of the focusing microlens array 208. The two beams may be an X polarization beam from one optical fiber and a Y polarization beam from a different optical fiber. Accordingly, the focusing microlens array 208 may not require a second subarray of microlenses. Instead, the focusing microlens array 208 can have additional row(s) and/or columns(s) at the edge(s) of the array. The center of each of the two beams that share a particular focusing microlens 108 may impinge on the shared microlens at a different angle and/or at a different point on the microlens. Thus, the microlens can direct them to different SGCs 110a, 110b at their respective desired angles, similar to the embodiments described above.

Figure 9:
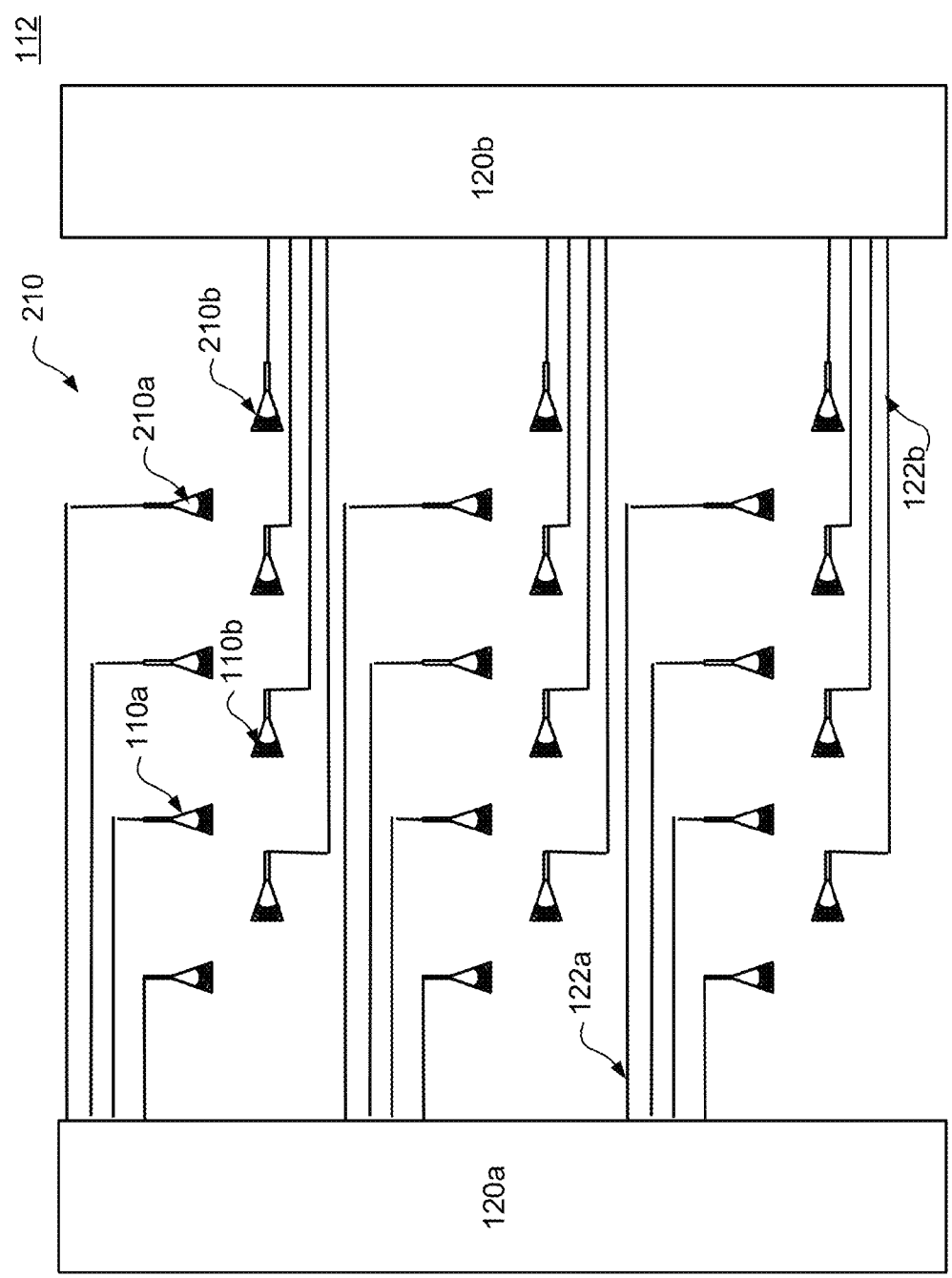
FIG. 9 is an array of surface grating couplers on a photonic circuit with polarization diversity, according to one embodiment.

FIG. 9 illustrates an SGC array 210 on the photonic chip 112 with polarization diversity, according to one embodiment of the disclosure. As shown in the figure, the SGC array 210 includes a first SGC sub-array 210a for coupling the X component beams and a separate second SGC sub-array 210b for coupling the Y component beams. The first SGC sub-array 210a receives the X component beams and is connected to a photonic circuit 120a for processing X component. The second SGC sub-array 210b receives the Y component beams and is connected to a photonic circuit 120b for processing Y component. In this particular embodiment, the SGCs of the sub-arrays 210a, 210b are shown as having the same physical structure, but rotated 90 degrees from each other. Optical waveguides for the X, Y component beams implement re-entrant routing to avoid crossing between the waveguides 122a for X component beams and the waveguides 122b for Y component beams. This may be realized for a large fiber count such as 1000 fibers.

Figure 10:
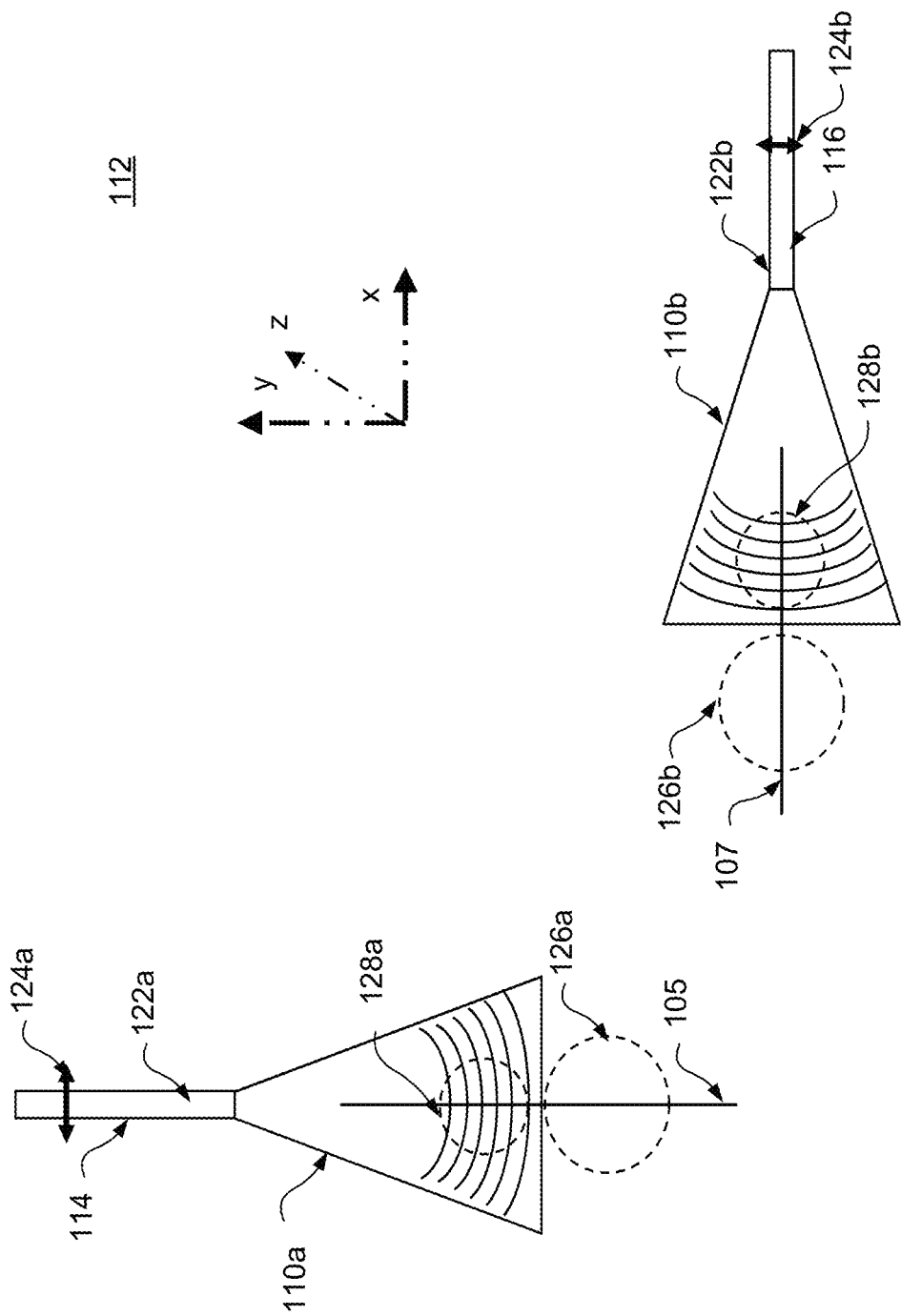
FIG. 10 is a close-up view of two surface grating couplers in the embodiment of FIG. 9.

FIG. 10 is a close-up view of two surface grating couplers 110a, 110b of the SGC array 210 of FIG. 9. The two SGCs 110a, 110b are both single polarization such as TE polarization. The X component beam 105 is in a plane that is formed by the normal to the photonic chip 112 and an output waveguide 122a of the SGC 110a. The Y component beam 107 is in a plane that is formed by the normal to the photonic chip 112 and an output waveguide 122b of the second SGC 110b.

A dotted circle 126a illustrates a cross-section of the X polarization component beam 105 at a distance above the photonic chip 112. The direction of propagation is mostly into the page (along the z axis) and at an acute angle to the y direction. A cross-section of the X polarization component beam 105 at a surface of the photonic chip 112 is illustrated by a dotted circle 128a. The X polarization component beam 105 propagates through an output waveguide 122a in TE0 mode containing the X component. The electric field 124a of the X component beam 105 in the waveguide 122a is along the x direction in the plane of the photonic chip 112.

A dotted circle 126b illustrates a cross-section of the Y polarization component beam 107 at a distance above the photonic chip 112. The direction of propagation is mostly into the page (along the z axis) and at an acute angle to the y direction. A cross-section of the Y polarization component beam 107 at the surface of the photonic chip 112 is illustrated by the dotted circle 128b. The Y polarization component beam 107 propagates through an output waveguide 122b where TE0 mode is excited, containing the Y component. The electric field 124b of the Y component beam 107 in the waveguide 122b is along the y direction in the plane of the photonic chip 112.

In this particular embodiment, the illustrated SGCs are of a curved focusing type. It should be understood that other suitable types of gratings can be used, such as a straight grating followed by a taper that narrows to an output waveguide.

In some embodiments, at least one of the X component beam 105 and Y component beam 107 is off-axis when they intersect their respective focusing microlenses. This is to compensate for the angle induced by the polarization splitting beam displacer 106 and direct the beams separately, so that each component beam 105, 107 can impinge on their respective SGC 110a, 110b at its corresponding coupling angle. The coupling angle of a SGC refers to the angle of incidence at which the interference created by the incident beam hitting the SGC grating is constructive and the corresponding SGC achieves a maximum efficiency. In one particular embodiment, the coupling angle for the SGC 110a for coupling the X component beam 105 is the same as the coupling angle for the SGC 110b for coupling the Y component beam 107.

In some embodiments, the maximum efficiency may be achieved when the incident beam impinges on the SGC at a small angle to the vertical, typically in the range 10 to 20 degrees, to reduce back-reflection and for easy manufacturing. However, in other embodiments, a normal-incidence SGC can be used where the SGC is of a type that functions maximally with a normal incident beam. In such cases, the focusing microlens(es) are arranged to produce beams that are normal to the photonic chip 112.

Figure 11:
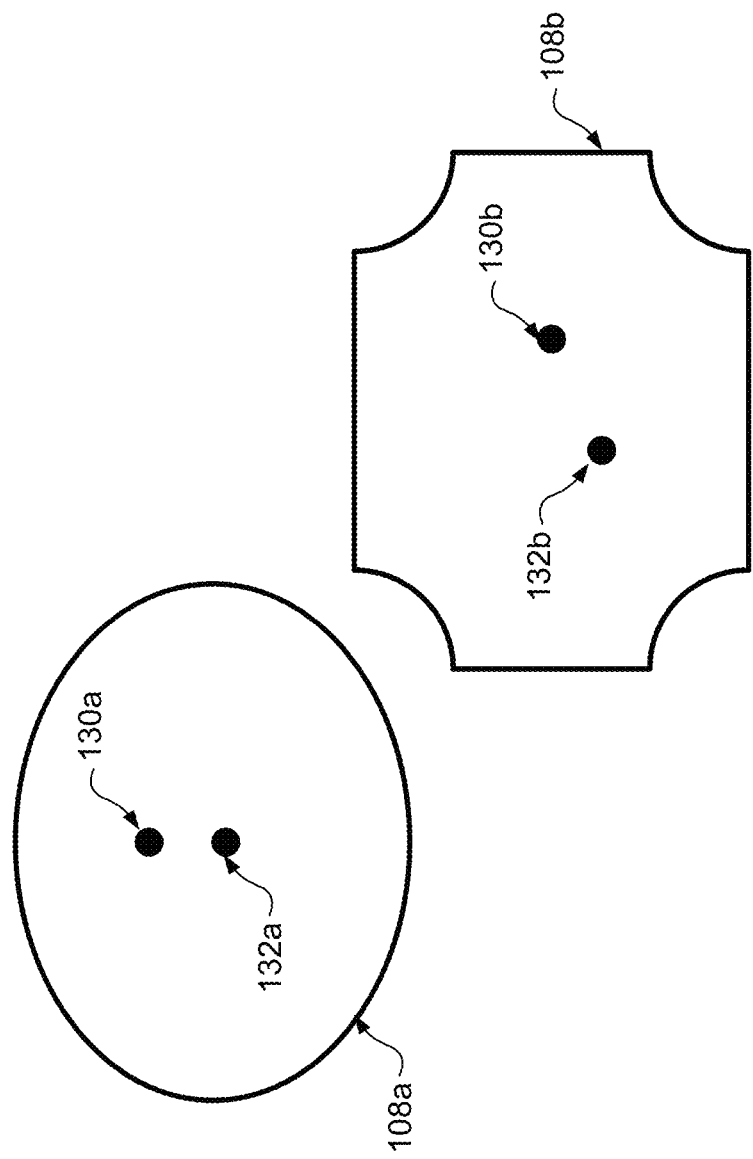
FIG. 11 is an example of intersections of X and Y component beams on their corresponding focusing microlenses.

FIG. 11 illustrates an example of intersections of X and Y component beams 105, 107 on their corresponding focusing microlenses 108a, 108b. As discussed above, at least one of the two orthogonal component beams 105, 107 intersects the focusing microlens 108a, 108b off-axis.

As shown in FIG. 11, the microlens 108a for X component can have its optical axis at 130a, whereas the center of X component beam intersects the microlens at 132a; and the microlens 108b of Y component has its optical axis at 130b, whereas the center of Y component beam intersects the microlens at 132b.

It should be noted that the microlenses 108a and 108b are illustrated in FIG. 11 with arbitrary shapes, and it should be understood that, more generally, microlenses may be of any suitable shape. As described above, the optical axes of the microlenses may be in the physical centers of the microlenses, or may be offset from the physical centers. The optical axes of the microlenses may be within the microlenses or outside of the respective microlenses. As well, the X and Y microlenses may have the same (or similar) or different parameters including shape, focal length, and the like. In one particular embodiment, the X and Y microlenses may have the same focal length and the lengths of the optical paths of the X component beam and the Y component beam can be generally the same.

Furthermore, the microlenses, and the focusing microlenses in particular, may not have rotational symmetry, i.e. the surface of the microlens may not be part of a surface that can be rotated without changing its shape. One example of such a microlens is a microlens with astigmatism.

In various embodiments described above, the operation of the optical coupling apparatuses 100, 200 is illustrated with reference to light travelling in the direction from the optical fiber 102 to the photonic chip 112. For example, referring back to FIG. 1, the "collimating" microlens 104 collimates the light beam 103, and the "focusing" microlens 108 focuses the polarized X, Y component beams 105, 107. However, it should be understood that the optical coupling apparatuses 100, 200 can be used or modified for coupling light travelling from the photonic chip 112 to the fiber 102. The optical coupling apparatuses 100, 200 can be further used or modified such that some optical beams couple from the optical fibers to the photonic chip and other optical beams couple from the photonic chip to the optical fibers. Some optical paths may be bidirectional, coupling light in both directions simultaneously. In a special case of the bi-directional scenario, the X component beam of one channel can be coupled from the optical fiber to the photonic chip and the Y component beam of the channel can be coupled from the photonic chip to the optical fiber. This can be useful for a system where an optical fiber is used for signals in both directions and polarization can be a discriminator between forward and return signals.

When the optical coupling apparatus is used for coupling a photonic chip 112 to an optical fiber 102 or optical fiber array 202, light may travel from the photonic chip to the optical fiber(s). In such cases, first and second SGCs 110a, 110b or SGC sub-arrays 210a, 210b are used for emitting X and Y component beams, respectively, from the photonic chip 112. The focusing microlens 108 or focusing microlens array 208 functions as a collimating microlens or collimating microlens array for collimating the emitted X and Y component beams from the photonic chip 112. The polarization splitting beam displacer 106 functions as a polarization beam combiner (or simply, a PC) for combining the X and Y component beams collimated by the collimating microlens(es) into a dual-polarization beam. The collimating microlens 104 or collimating microlens array 204 functions as a focusing microlens or focusing microlens array. One skilled in the art would appreciate that a same microlens can be referred to as a collimating lens or a focusing microlens, dependent on the direction of light propagation. Similarly, a polarization splitting beam displacer can be referred to as a polarization beam combiner when the direction of the light propagation is reversed. It is therefore to be understood that the terms "collimating", "focusing", "splitter", and "combiner" are merely identifiers and are not intended to imply direction of propagation of light, which may be reversed as explained above. Furthermore, at small beam sizes, the micro-beams are never truly "collimated" in a sense that they are parallel, non-expanding optical beams. Rather, the beams are re-focused, with a corresponding transformation of Gaussian waist size and position.

Figure 12:
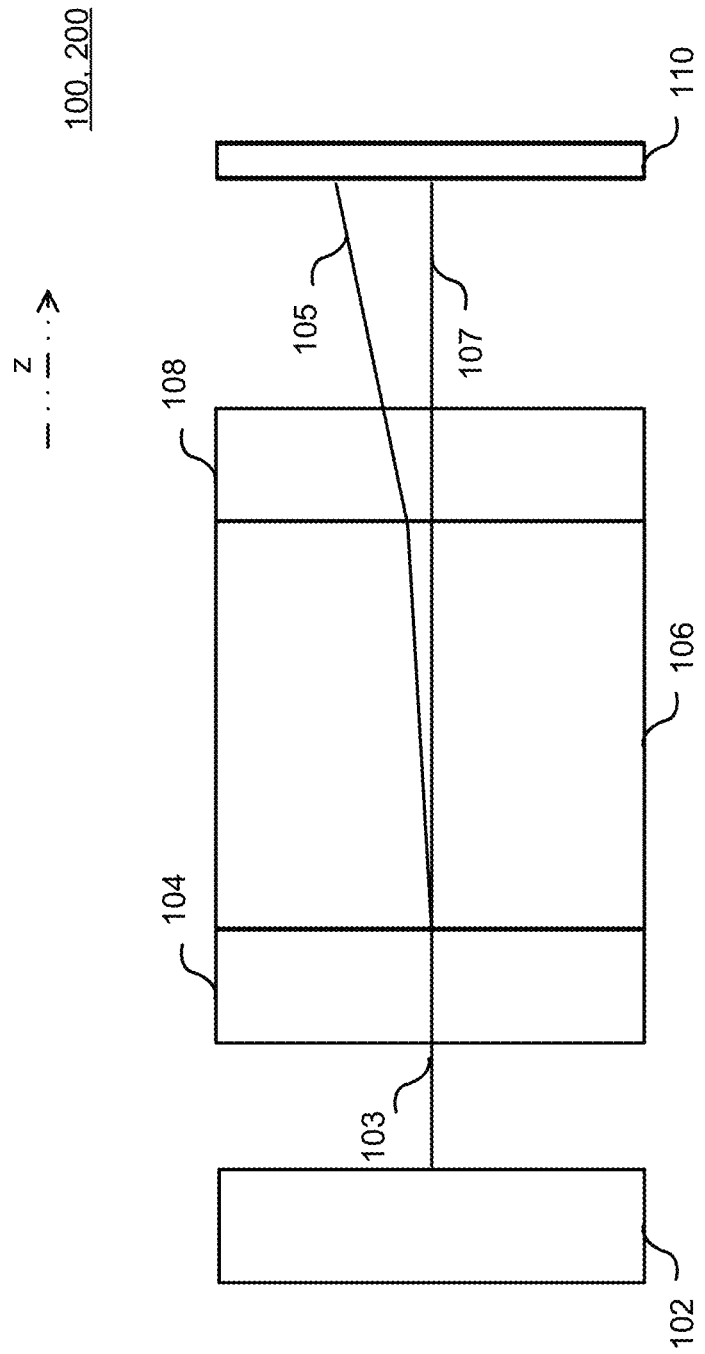
FIG. 12 is an elevation view of the optical coupling apparatus, according to one embodiment.

FIG. 12 is an elevation view of the optical coupling apparatuses 100, 200, according to various embodiments of the disclosure. For purposes of simplicity, FIG. 12 illustrates the Y component beam 107 undeviated in the plane of the drawing and the X component beam 105 exiting the polarization splitting beam displacer 106 at a displacement and an angle with respect to the Y component beam 107. However as discussed above, it should be understood that various other implementations are also possible. As well, the deviations of the X component beam 105 through the polarization splitting beam displacer 106 and the focusing microlens 108 in FIG. 12 are illustrated as being in the plane of FIG. 12, it should however be understood that the deviations of the X component beam 105 may occur an arbitrary plane.

In some embodiments of the disclosure, the optical fibers 102 may be positioned normal to the photonic chip 112, where light travels along the z axis, that is, perpendicular to the photonic chip 112, or at a small angle to the z axis. According to such embodiments, the overall apparatuses 100, 200 may include long arrays of optical fibers 102, extending a large distance normal to the photonic chip 112 (i.e., along the z-axis).

Figure 13:
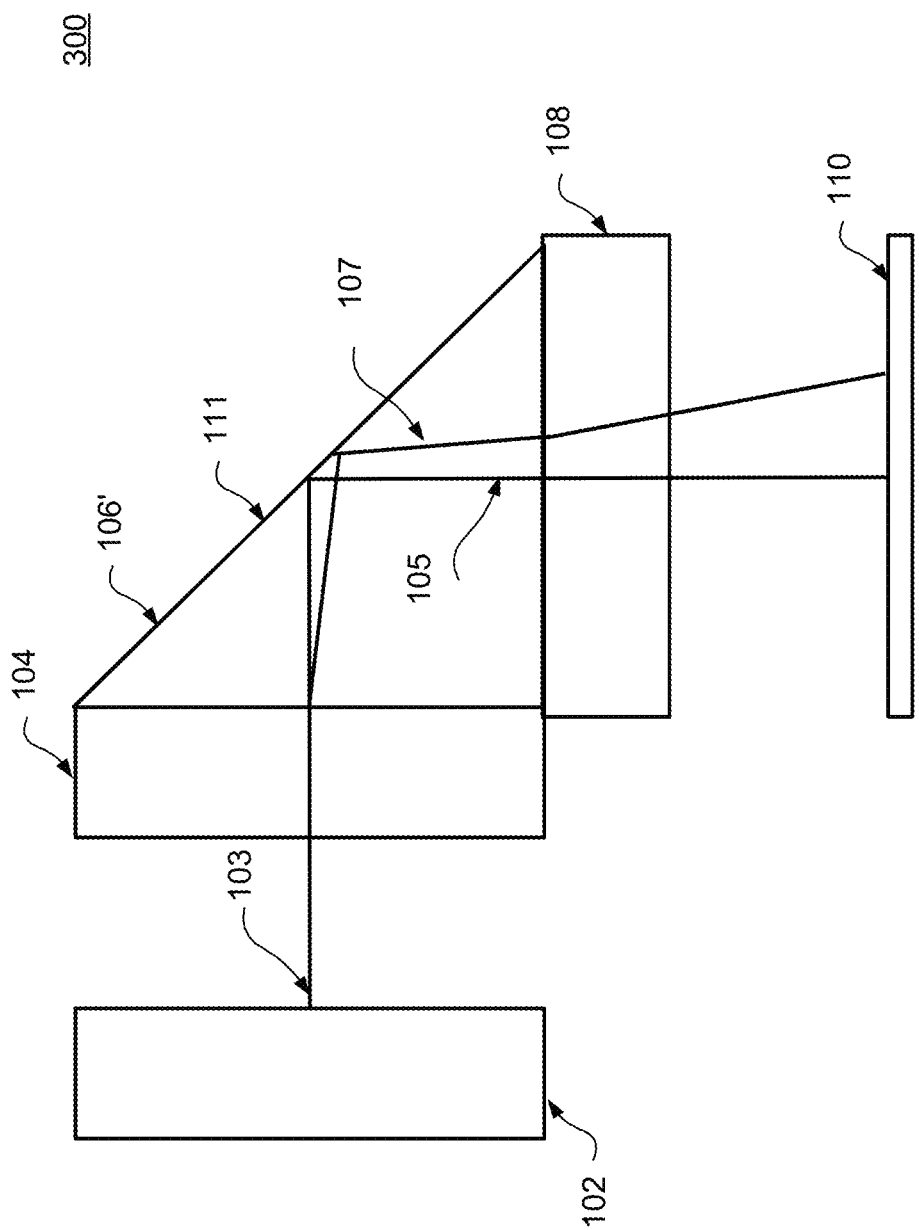
FIG. 13 is an elevation view of the optical coupling apparatus, according to another embodiment.

In some embodiments, the polarization splitting beam displacer 106 can include or be used in combination with a reflective turning surface to change the direction of the light propagation in order to reduce the height of the overall apparatus. The polarization splitting beam displacer 106 can comprise a polarization-selective reflector. FIG. 13 is an elevational view of an optical coupling apparatus 300, according to one such embodiment. In the embodiment illustrated by way of FIG. 13, the optical coupling apparatus 300 includes a polarization splitting beam displacer 106' which is provided with a reflective turning surface 111 for reflecting the X component beam 105 and the Y component beam 107 differently to achieve a spatial separation between the two component beams.

For example, the reflective turning surface 111 can be a mirror surface such as a 45° turning mirror surface disposed in an optical path between the collimating microlens 104 and the focusing microlens 108, as shown. The reflective turning surface 111 can include a total internal reflecting surface. The optical fibers 102 can thereby be arranged to be parallel or nearly parallel to the photonic chip 112. The overall height can thus be greatly reduced. The reflective turning surface 111 may be a surface of the polarization splitting beam displacer 106' having a reflective coating. Alternatively, the polarization splitting beam displacer 106' may comprise two blocks joined with an angled surface that reflects the two polarization component beams at different angles, according to the difference in refractive index between two polarizations. Many types of polarization splitting beam displacers can be used that comprise birefringent elements, including for example, Glan-Taylor prism, Glan-Foucault prism, Glan-Thompson prism, Nicol prism, Nomarski prism, Wollaston prism, Senarmont prism, Rochon prism, etc. In addition to cube-type polarization splitting beam displacers, polarization-dependent thin films can be used as well. Suitable turning surfaces can be used in combination with such polarization splitting beam displacers to separate the X and Y polarization component beams.

Although all the elements in the coupling apparatus may be reciprocal in that their behaviors are independent of the direction of light propagation, there may be spatial filtering and/or diffraction effects that can break the reciprocity when the elements are assembled in the coupling apparatus.

For example, when an input light beam impinges on the SGC 110a, 110b in FIG. 12, the input light induces the desired mode and other high-order modes in the photonic chip 112. An output light beam emitted from the SGC 110a, 110b is constructed from only the desired mode of the photonic chip 112, and thus the beam that it produces is not identical to the incident beam. Further, the microlens can clip a fraction of the light at the periphery of the beam. The optical configuration may therefore include SGCs 110a, 110b and microlenses 104, 108 that differ based on their intended direction of use. SGCs and microlenses may be manufactured using lithographic processes that permit each element to be different, and hence such non-uniform optical configurations can readily be manufactured. For example, for a channel where the light passes from the optical fiber 102 to the photonic chip 112, the microlens on the collimating microlens array 204 may be larger than the microlens on the focusing microlens array 208. For a channel where the light passes from the photonic chip 112 to the optical fiber 102, the microlens on the collimating microlens array 204 may be smaller than the microlens of the focusing microlens array 208. The method of optimizing the optical configuration may include analytical and numerical electromagnetic modeling techniques such as ray tracing, paraxial Gaussian beam analysis, and three-dimensional finite difference time domain calculations.

Most SGCs are configured for a spot size that matches the spot size of the optical fiber (e.g., about 10 µm diameter). However, the most difficult alignment step during manufacture is to align the beams at the SGCs. Thus, according to some embodiments of the disclosure, the spot size at the SGC 110a, 110b may be made larger than the spot size at the optical fiber 102. As a result, the alignment tolerance at the SGC 110a, 110b can be relaxed. As an example, SGC designed for approximately 25 µm beam diameter could be suitable for this purpose. The optical coupling apparatus can be arranged to provide such an imaging magnification.

Figure 14:
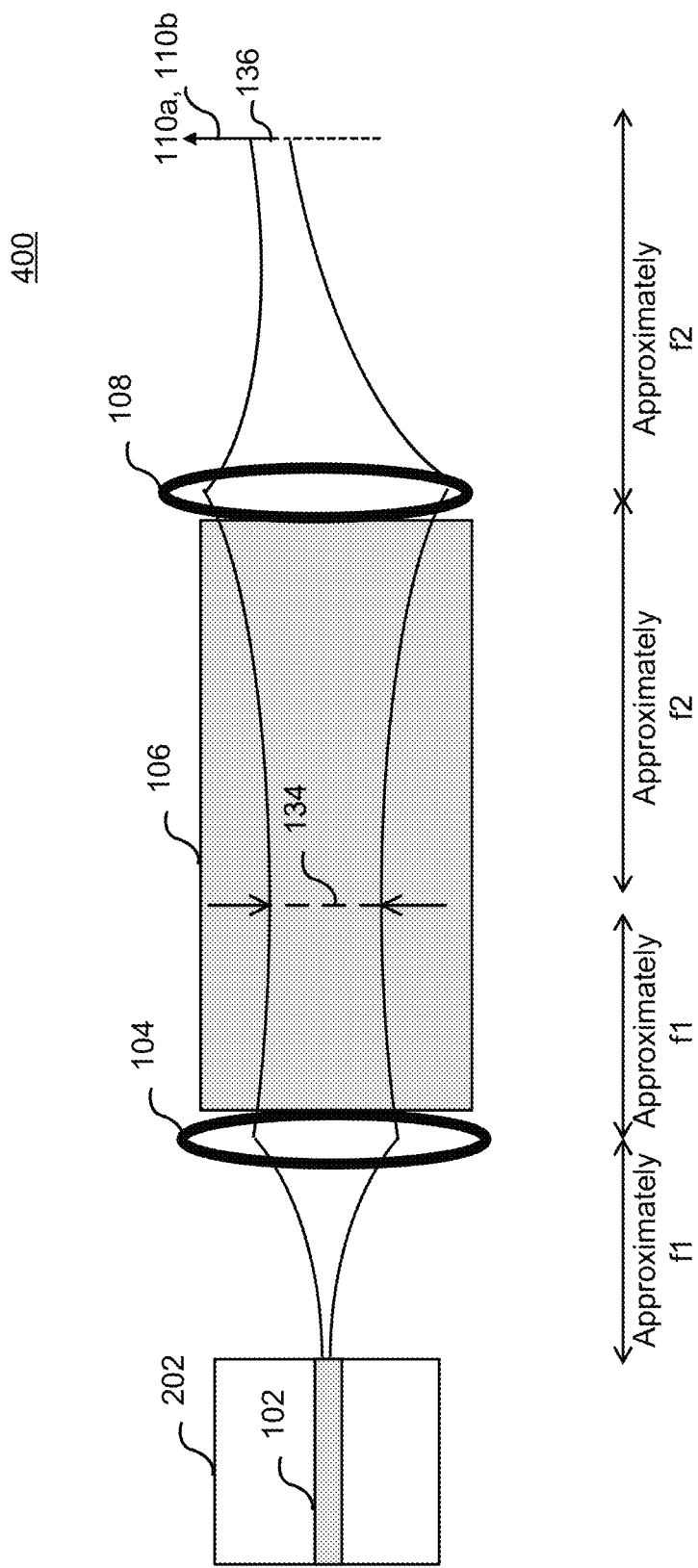
FIG. 14 is an optical coupling apparatus with image magnifying, according to one embodiment.

FIG. 14 illustrates an optical coupling apparatus 400 with image magnifying, according to an embodiment of the disclosure. In this embodiment, FIG. 14 illustrates imaging of a Gaussian beam and about two times magnification of spot size at the SGC 110a, 110b compared to at the optical fiber 102. That is, the spot size at the SGC 110a, 110b is about two times the spot size at the optical fiber 202. The focal length of the microlens of the collimating microlens array 204 is f1 and the focal length of the microlens of the focusing microlens array 208 is f2 which equals approximately 2f1.

Referring to FIG. 14, the optical beam is shown by curves where the intensity of the light is $1/e^2=14\%$ of the intensity at the center of the beam. The spot size, or radius of curvature of the beam is at a minimum value at one place along the beam axis, known as the beam waist. In FIG. 14, the beam waist of the collimated beam is illustrated by 134, at the neck of the light in the polarization splitting beam displacer 106. As illustrated in FIG. 14, the beam waist 136 at the SGC 110a, 110b is larger than the beam waist at the optical fiber 102. In this embodiment, the beam waist 136 at the SGC 110a, 110b is about two times the beam waist at the optical fiber 102. Of course, the exact magnification depends on the required size of the beam waist 136 and may differ from the value of 2.

Figure 15:
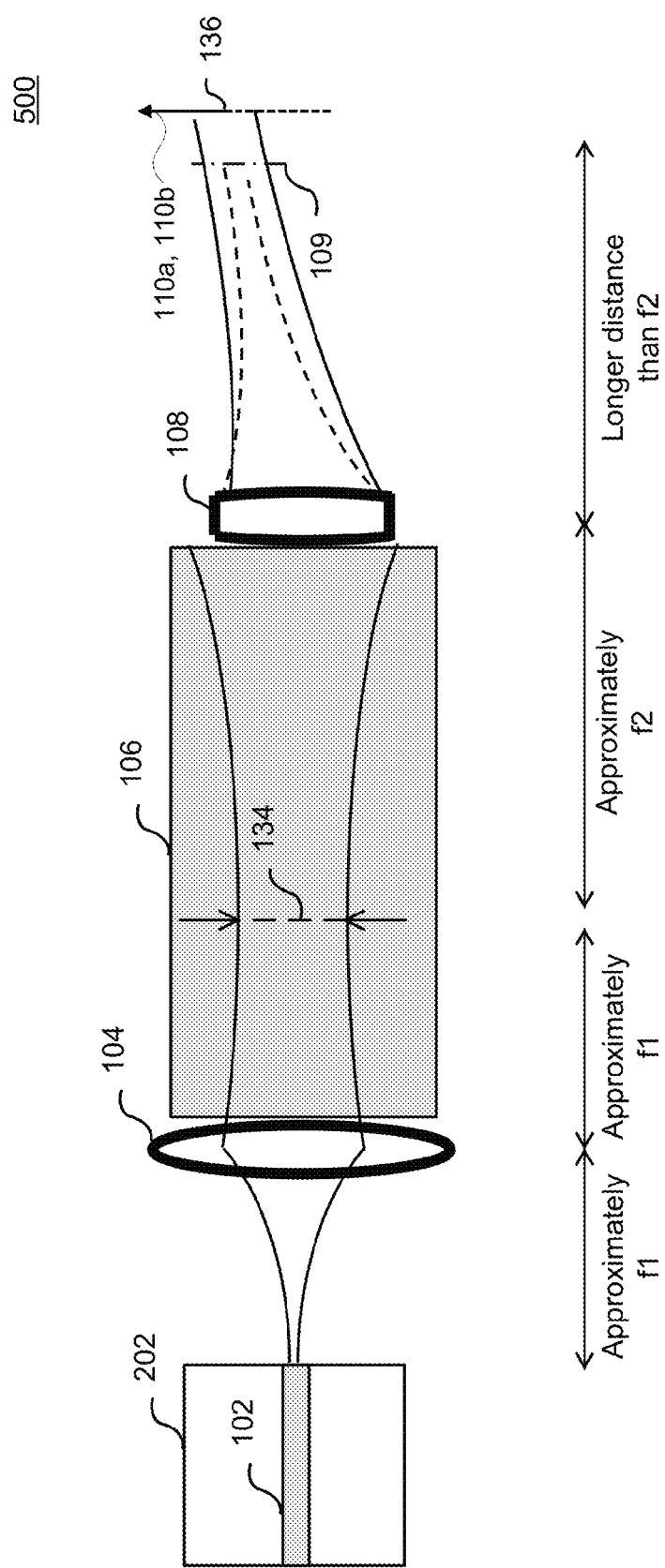
FIG. 15 is an optical coupling apparatus with image magnifying, according to another embodiment, illustrating a clipping effect.

FIG. 15 illustrates an optical coupling apparatus 500 with image magnifying, according to an embodiment of the disclosure, showing a clipping effect.

The microlenses in the focusing microlens array 208 may be positioned close to each other in order to make the apparatus small, which may impose limitations on the size of the focusing microlens 108. At the same time, a desired beam should be sufficiently big to propagate through the polarization splitting beam displacer 106 as a collimated beam. Accordingly, the edge of the beam may be clipped by the edge of the focusing microlens 108.

The structure of the system in FIG. 15 is similar to that in FIG. 14 with the same focal lengths f1, f2 as in FIG. 14. However, the diameter of the focusing microlens 108 is made smaller. As shown in FIG. 15, the best position for the SGC 110a, 110b without clipping is at 109. This is closer than the best position for the SGC 110a, 110b with clipping. At this position, the beam waist 136 at the SGC 110a, 110b is more than two times larger than the beam waist at the optical fiber 102.

Gaussian beam clipping is described in G. D. Gillen, C. M. Seck, and S. Guha, "Analytical beam propagation model for clipped focused-Gaussian beams using vector diffraction theory," Opt. Exp., vol. 18, no. 5, pp. 4023-4040, 2010, incorporated herein by reference. General description of Gaussian beams can be found in, http://www.rp-photonics.com/gaussian_beams.html, and R. Paschotta, "Gaussian beams" in the Encyclopedia of Laser Physics and Technology, first edition October 2008, Wiley-VCH, ISBN 978-3-527-40828-3, also incorporated herein by reference.

Figure 16:
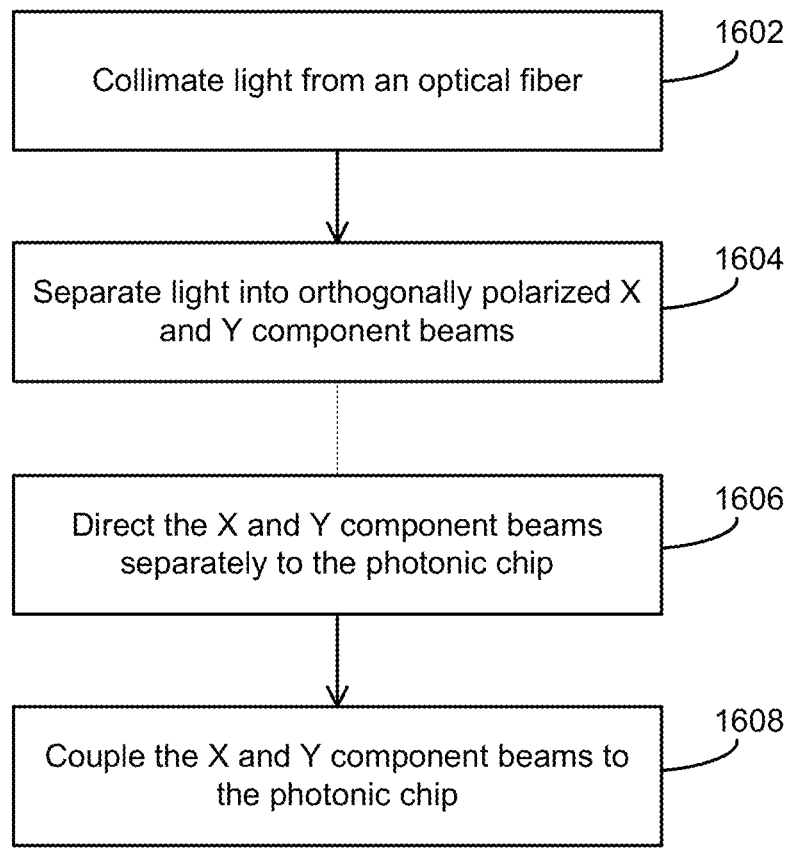
FIG. 16 is a flowchart of a method for coupling from a fiber to a photonic chip, according to some embodiments.

FIG. 16 illustrates a method for coupling between the optical fiber 102 and the photonic chip 112, according to an embodiment of the disclosure. Light from the optical fiber 102 is collimated (1602) and separated (1604) into orthogonally polarized X and Y component beams 105, 107. As discussed above, this can be done by a polarization splitting beam displacer 106, 106' of any suitable structure and material to achieve a spatial separation between the X, Y component beams 105, 107. The X, Y component beams 105, 107 are directed (1606) separately to the photonic chip 112, for example, either by a single focusing microlens 108, or by two separate focusing microlenses 108a, 108b (i.e., first and second focusing microlenses). The X, Y component beams 105, 107 are coupled (1608) to the photonic chip 112 by first and second SGCs 110a, 110b. As discussed above, the first and second SGCs 110a, 110b are orthogonally disposed on the photonic chip 112 and configured for operation in a same polarization mode (such as TE). As also discussed above, at least one of the X and Y component beams can be disposed off-axis with respect to the optical axis of the corresponding focusing microlens. The X, Y component beams 105, 107 can thereby be directed separately onto the photonic chip 112 at coupling angles of the first and second SGCs 110a, 110b, respectively. A spot size of light from the optical fiber 102 can be magnified through the optical coupling apparatus.

According to various embodiments of the disclosure, a dual polarization optical coupling apparatus can be provided by assembling an optical fiber array with off-chip PS/PC and single-polarization SGCs such as TE SGCs. The single-polarization SGCs can be oriented such that X and Y component beams each encounters only a single-polarization SGC. This is done using a polarization splitting beam displacer and a set of (or two interleaved sets of) off-axis microlenses to create a set of X component beams at one angle and a set of Y component beams at a different angle. The angles are aligned to the respective coupling angles of two interleaved sets of SGCs where all grating couplers are of the same polarization. The beams hit the microlenses off-axis laterally and/or vertically, so the coupling angles of X and Y gratings can be achieved.

According to one particular implementation, the collimated beam radius may be less than 25% of the diameter of the collimating/focusing microlens 104, 108, and has a Rayleigh range that is more than two times the thickness of the polarization splitting beam displacer 106. The amount of optical power clipped by each microlens 104, 108 can be less than 1%. The microlenses of the collimating microlens array 204 may be on a rectangular grid of 127 μm by $\sqrt{3} \times 127$ μm. The microlenses for X component (X microlenses) in the focusing microlens array 208 can be arranged on the same grid. The microlenses for Y component (Y microlenses) in the focusing microlens array 208 can be on the same grid but offset laterally by 127 μm and at 60 degrees diagonally from the X microlenses on a nearly hexagonal close-packed arrangement, as shown at 218 in FIG. 8. This provides a close packing of the focusing microlens array 208. Each beam can experience a two-time magnifying telescope, as discussed above. The beam radius (or spot size) at the optical fiber 102 can be around 3 μm to 4 μm and the beam radius (or spot size) at the SGC 110a, 110b can be around 5 μm to 8 μm, when the focal length of the focusing microlens 108 is around twice the focal length of the collimating microlens 104. The alignment tolerance at the SGC 110a, 110b is proportional to the beam radius (or spot size) at the SGC. Therefore, the alignment tolerance at the SGC 110a, 110b may be increased by the magnification of the beam radius, and the apparatus may be easier to assemble than an apparatus that lacks this magnification.

By way of the optical coupling apparatus described, a large number of optical fibers can be coupled to a photonic chip with polarization diversity.

According to various embodiments, both polarization component beams can be handled with the same polarization gratings. In theory, TE SGCs and TM SGCs can be made on the same photonic chip. However, the coupling angle reacts to manufacturing variations differently for TE SGCs and TM SGCs. Therefore, it may be difficult to yield both with the same coupling angle. Further, the manufacturing process for the best TE SGC is not generally the same as for the best TM SGC, so the performance of one or both will be compromised. Accordingly, a photonic chip that uses only one SGC polarization will have a better performance and a higher yield than a chip that requires both SGC polarizations.

Off-chip PS/PC have been manufactured with high performance. By way of the dual polarization optical coupling apparatus provided according to various embodiments of the disclosure, the cost and size of the off-chip PS/PC can be shared across many channels, so the cost and size per channel can be small. Further, the off-chip PS/PC is assembled within the optical coupling apparatus simply as a face-to-face alignment of two polished surfaces, which can be achieved by an inexpensive assembly process.

In principle, the dual polarization optical coupling apparatus according to the various embodiments of the disclosure may enable a low cost and a low loss assembly for a large fiber count on a photonic chip with polarization diversity. Because it is grating coupled, re-entrant routing can be used so the waveguides of X component do not need to cross the waveguides of Y component. A microlens imaging system can provide a larger beam, e.g. two times bigger beam at the photonic chip than at the optical fiber, reducing alignment tolerance by two times and also reducing cost.

The optical coupling apparatus according to various embodiments may be used for reconfigurable fiber optic communications, particularly for optical add/drop wavelength-division multiplexing (WDM) applications in metro optical networks, WDM passive optical network (PON), wireless aggregation network/Cloud-radio access network (C-RAN), and may be used for reconfigurable data center networks and high-performance computing, data center transceivers, data center core switching network, or coherent optical transceivers in Metro and Long Haul.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical coupling apparatus for coupling an optical fiber to a photonic chip, comprising:
   a collimating microlens for collimating light from the optical fiber;
   a polarization splitting beam displacer for separating the light collimated by the collimating microlens into orthogonally polarized X and Y component beams;
   at least one focusing microlens for directing the X and Y component beams separately onto the photonic chip; and
   first and second surface grating couplers (SGCs) orthogonally disposed on the photonic chip and configured for operation in a same polarization state, for coupling the X and Y component beams, respectively, to the photonic chip.

2. The optical coupling apparatus of claim 1, wherein the at least one focusing microlens comprises a single focusing microlens for directing both the X and Y component beams, respectively, onto the first and second SGCs.

3. The optical coupling apparatus of claim 1, wherein the at least one focusing microlens comprises first and second focusing microlenses for directing the X and Y component beams, respectively, onto the first and second SGCs, respectively.

4. The optical coupling apparatus of claim 1, wherein at least one of the X and Y component beams impinges on the corresponding focusing microlens parallel to an optical axis of the focusing microlens but offset with respect to the optical axis.

5. The optical coupling apparatus of claim 1, wherein at least one of the X and Y component beams impinges on the corresponding focusing microlens as a skew beam.

6. The optical coupling apparatus of claim 1, further comprising:
    an array of optical fibers including the optical fiber;
    a collimating microlens array including the collimating microlens, for collimating light from the array of optical fibers, wherein the polarization splitting beam displacer is configured for separating light collimated by each microlens of the collimating microlens array into orthogonally polarized X and Y component beams;
    a focusing microlens array including the at least one focusing microlens, for directing the X and Y component beams separately onto the photonic chip; and
    an SGC array configured for operation in a same polarization state and comprising first and second SGC sub-arrays including the first and second SGCs, respectively,
    wherein the first and second SGC sub-arrays are configured for coupling the X and Y component beams, respectively, separately to the photonic chip.

7. The optical coupling apparatus of claim 6, wherein the focusing microlens array includes first and second focusing microlens sub-arrays for focusing the X and Y component beams, respectively, onto the first and second SGC sub-arrays, respectively.

8. The optical coupling apparatus of claim 7, wherein the first and second focusing microlens sub-arrays are arranged in alternating rows.

9. The optical coupling apparatus of claim 8, wherein the alternating rows form a non-rectangular pattern of microlenses.

10. The optical coupling apparatus of claim 8, further comprising a spacer defining a distance between the focusing microlens array and the photonic chip.

11. The optical coupling apparatus of claim 1, wherein the polarization splitting beam displacer comprises a birefringent plate.

12. The optical coupling apparatus of claim 1, wherein the polarization splitting beam displacer comprises a polarization-selective reflector.

13. The optical coupling apparatus of claim 1, wherein the at least one focusing microlens is configured for directing the X and Y component beams away from each other and towards the photonic chip, such that angles of incidence of the X and Y component beams onto the photonic chip correspond to coupling angles of the first and second SGCs, respectively.

14. The optical coupling apparatus of claim 13, wherein the at least one focusing microlens is disposed off-axis with respect to the X and Y component beams.

15. The optical coupling apparatus of claim 1, wherein a spot size of light at the SGCs is larger than a spot size of light from the optical fiber.

16. The optical coupling apparatus of claim 1, wherein the optical fiber is parallel to the photonic chip.

17. The optical coupling apparatus according to claim 1, wherein a focal length of the focusing microlens is greater than a focal length of the collimating microlens.

* * * * *